(12) United States Patent
Nakajima

(10) Patent No.: US 9,759,458 B2
(45) Date of Patent: Sep. 12, 2017

(54) TEMPERATURE ADJUSTMENT APPARATUS UTILIZING STATE DETECTOR DETECTING THE ELECTRICAL STATE OF THE PELTIER DEVICE

(71) Applicant: SMC Corporation, Chiyoda-ku (JP)

(72) Inventor: Tadao Nakajima, Ushiku (JP)

(73) Assignee: SMC CORPORATION, Chiyoda-ku (JP)

( * ) Notice: Subject to any disclaimer, the term of this patent is extended or adjusted under 35 U.S.C. 154(b) by 298 days.

(21) Appl. No.: 14/531,057

(22) Filed: Nov. 3, 2014

(65) Prior Publication Data

US 2015/0121899 A1 May 7, 2015

(30) Foreign Application Priority Data

Nov. 7, 2013 (JP) ................................ 2013-231469

(51) Int. Cl.

| F25B 21/02 | (2006.01) |
|---|---|
| H05B 3/02 | (2006.01) |
| F25B 21/04 | (2006.01) |
| G01K 3/14 | (2006.01) |
| G05D 23/19 | (2006.01) |

(52) U.S. Cl.
CPC ............... *F25B 21/04* (2013.01); *G01K 3/14* (2013.01); *G05D 23/1919* (2013.01); *F25B 2321/0212* (2013.01)

(58) Field of Classification Search
CPC ............... G05D 23/1919; G01K 3/14; F25B 2321/0212; F25B 21/04

USPC .............................................. 219/488; 62/3.7
See application file for complete search history.

(56) References Cited

U.S. PATENT DOCUMENTS

| 5,371,665 A * | 12/1994 | Quisenberry | F25B 21/02 |
|---|---|---|---|
| | | | 363/89 |
| 6,769,482 B2 * | 8/2004 | Wagner | F24F 11/0012 |
| | | | 165/238 |
| 2005/0039465 A1 * | 2/2005 | Welch | F25B 21/04 |
| | | | 62/3.7 |

FOREIGN PATENT DOCUMENTS

| JP | 2000-353830 A | 12/2000 |
|---|---|---|
| JP | 2003-208231 A | 7/2003 |
| JP | 2003-332641 A | 11/2003 |
| JP | 2004-270987 | 9/2004 |
| JP | 3660963 | 6/2005 |

OTHER PUBLICATIONS

Machine Translation of JP 2003-208231 to Watanabe, Jul. 25, 2003, PAJ, all.*

(Continued)

*Primary Examiner* — Allen Flanigan
*Assistant Examiner* — Filip Zec
(74) *Attorney, Agent, or Firm* — Oblon, McClelland, Maier & Neustadt, L.L.P.

(57) ABSTRACT

A drive circuit of a temperature adjustment apparatus drives a Peltier element at a desired output amount. A state detector detects an electrical state of the Peltier element. A control circuit calculates a desired output amount based at least on the electrical state of the Peltier element, determines a control quantity for driving the Peltier element at the desired output amount, and controls the drive circuit at the control quantity.

11 Claims, 19 Drawing Sheets

(56) References Cited

OTHER PUBLICATIONS

Office Action issued Oct. 27, 2015 in Japanese Patent Application No. 2013-231469 (with partial English language translation).

* cited by examiner

TEMPERATURE ADJUSTMENT APPARATUS UTILIZING STATE DETECTOR DETECTING THE ELECTRICAL STATE OF THE PELTIER DEVICE

CROSS-REFERENCE TO RELATED APPLICATION

This application is based upon and claims the benefit of priority from Japanese Patent Application No. 2013-231469 filed on Nov. 7, 2013, the contents of which are incorporated herein by reference.

BACKGROUND OF THE INVENTION

Field of the Invention

The present invention relates to a temperature adjustment apparatus for adjusting the temperature of a control object using a Peltier element.

Description of the Related Art

Heretofore, for example, as disclosed in Japanese Patent No. 3660963 (hereinafter referred to as the "conventional technique"), a temperature adjustment apparatus is known that adjusts the temperature of a control object using a Peltier element. With such a temperature adjustment apparatus, a temperature sensor detects the temperature of the control object, a temperature regulator outputs an operating quantity for adjusting the detected temperature to a desired temperature, and a drive circuit drives a Peltier element at an output amount that is proportional to (dependent on) the operating quantity.

In this case, within a region where the absolute value of the operating quantity is low, a time-based proportional control (PWM control) is carried out in which a pulse voltage of the same voltage value is applied repeatedly to the Peltier element. On the other hand, within a region where the absolute value of the operating quantity is high, a variable voltage control is carried out in which a DC voltage, the magnitude of which can be adjusted, is applied continuously to the Peltier element.

SUMMARY OF THE INVENTION

In this manner, with the conventional technique, the temperature of the control object is fed back to the temperature regulator, and the temperature of the control object is controlled to attain a desired temperature.

However, with the conventional technique, a temperature control is not performed that takes into consideration the electrical state of the Peltier element (i.e., the DC voltage and the direct current applied to the Peltier element, the electromotive force between a heating side and a heat-absorbing side of the Peltier element). As a result, if a temperature control is performed in which the maximum standard values of the Peltier element (permissible values for the DC voltage, the direct current, and the electromotive force) are exceeded, the capability and performance of the Peltier element may deteriorate, or the Peltier element may suffer from a failure.

Thus, conventionally, the temperature adjustment apparatus has been designed based on standard values that are set to be lower than the maximum standard values recommended by the manufacturer of the Peltier element. In this manner, since usage does not take place up to such maximum standard values, it becomes difficult for the temperature adjustment capability (i.e., the heating capacity and the cooling capacity with respect to the control object) of the temperature adjustment apparatus with respect to the control object to be brought out to the maximum available extent.

The present invention has been devised with the aim of solving the aforementioned problem, and has the object of providing a temperature adjustment apparatus, which is capable of enhancing the temperature adjusting capability, without causing deterioration to the performance or a failure of the Peltier element.

The present invention is a temperature adjustment apparatus for adjusting the temperature of a control object using a Peltier element, and includes a drive circuit, a state detector, and a control circuit. The drive circuit drives the Peltier element at a desired output amount. The state detector detects an electrical state of the Peltier element. The control circuit calculates a desired output amount based at least on the electrical state of the Peltier element, determines a control quantity for driving the Peltier element at the desired output amount, and controls the drive circuit at the control quantity.

In the foregoing manner, the control circuit calculates the desired output amount by extracting at least the electrical state of the Peltier element, and a control is adopted to control the drive circuit with the control quantity based on the calculated desired output amount. That is, with the control circuit, a control (feedback control) is adopted such that the electrical state is reflected on the Peltier element. Therefore, compared to the conventional technique in which a control (in which the electrical state is not reflected, i.e., an open loop control) is adopted such that the electrical state of the Peltier element is not taken into consideration, with the present invention, deterioration in performance and failure of the Peltier element can be avoided. As a result, with the present invention, since it is possible to operate the temperature adjustment apparatus up to the maximum standard value of the Peltier element, the temperature adjustment capability (i.e., the heating capacity and the cooling capacity with respect to the control object) of the temperature adjustment apparatus can be enhanced.

The drive circuit may comprise a DC power source that causes a direct current to flow to the Peltier element, by applying a DC voltage as the output amount to the Peltier element. In this case, the electrical state of the Peltier element is defined by the DC voltage, the direct current, and an electromotive force of the Peltier element. Further, the state detector includes a voltage detecting circuit configured to detect the DC voltage, a current detecting circuit configured to detect the direct current, and an electromotive force detecting circuit configured to detect the electromotive force.

Accordingly, using the detected DC voltage, the direct current, and the electromotive force, the control circuit determines the control quantity with respect to the drive circuit, and controls the drive circuit and the control quantity. As a result, an appropriate DC voltage and direct current can be supplied to the Peltier element from the DC power source.

In this case, assuming that the DC power source is a variable power source in which a value of the direct current can be varied by changing a value of the DC voltage, the control circuit performs a variable control by controlling the DC power source, whereby the value of the DC voltage and the value of the direct current are changed to desired values responsive to the control quantity. Consequently, responsive to the control quantity, the DC voltage and the direct current can continuously be changed. Further, the generation of peak currents caused by repeated ON and OFF operations, such as in a PWM control, can be prevented.

The temperature adjustment apparatus further includes a parameter setting unit configured to set a parameter related to operation of the Peltier element. In this case, the control circuit controls the drive circuit based on the parameter, the DC voltage detected by the voltage detecting circuit, the direct current detected by the current detecting circuit, and the electromotive force detected by the electromotive force detecting circuit. Consequently, driving of the Peltier element can be carried out optimally.

Herein, the parameters are a maximum voltage value, which is a maximum value of the DC voltage that can be applied to the Peltier element, a current limit value, which is a maximum value of the direct current flowing to the Peltier element, and a temperature difference limit value, which is a permissible value of a temperature difference between a heat-absorbing side and a heat-radiating side of the Peltier element corresponding to the electromotive force.

Further, the control circuit comprises a temperature difference converting unit, which converts the electromotive force detected by the electromotive force detecting circuit into the temperature difference. In this case, the drive circuit is controlled based on a comparison between the maximum voltage value and the DC voltage detected by the voltage detecting circuit, a comparison between the current limit value and the direct current detected by the current detecting circuit, and a comparison between the temperature difference limit value and the temperature difference converted by the temperature difference converting unit.

If the DC voltage exceeds the maximum voltage value, the direct current exceeds the current limit value, or the temperature difference exceeds the temperature difference limit value, there is a concern that the performance of the Peltier element may be deteriorated, or that the Peltier element may suffer from a failure. Thus, by controlling the drive circuit based on comparisons with the maximum voltage value, the current limit value, and the temperature difference limit value, without causing deterioration or a failure of the Peltier element, the Peltier element can be used up to its maximum standard values (the maximum voltage value, the current limit value, and the temperature difference limit value). As a result, the heating capacity and the cooling capacity of the temperature adjustment apparatus can be drawn out to their maximum extent, and temperature management (monitoring) of the control object can be carried out optimally.

More specifically, in a case that a DC voltage is applied to the Peltier element from the DC power source, and when the direct current detected by the current detecting circuit exceeds the current limit value, control with respect to the DC power source is switched from a variable voltage control, which is configured to vary a value of the DC voltage, to a constant current operation for holding the value of the DC voltage at a predetermined value while maintaining the direct current at the current limit value. On the other hand, if the direct current detected by the current detecting circuit becomes less than or equal to the current limit value, the control with respect to the DC power source is restored from the constant current operation to the variable voltage control.

The Peltier element possesses characteristics such that, accompanying a temperature difference between a heat-absorbing side and a heat-radiating side thereof, the resistance value and the heat-absorbing amount (electromotive force) of the Peltier element are changed. For this reason, even if the same voltage is applied to the Peltier element, due to the temperature state of the Peltier element, cases may occur in which the direct current exceeds the maximum standard value (the current limit value). Consequently, as described above, in the event that a direct current flows in excess of the current limit value, by switching to the constant current operation, deterioration in performance or a failure of the Peltier element can effectively be avoided. Further, when the direct current is decreased to a value that is less than or equal to the current limit value, by returning from the constant current operation to the variable voltage control, the original control can quickly be restored.

Further, in a case that the temperature difference converted by the temperature difference converting unit has exceeded the temperature difference limit value, the control circuit controls the DC power source so that the temperature difference becomes less than or equal to the temperature difference limit value, and the value of the DC voltage is reduced. Consequently, deterioration in performance or a failure of the Peltier element caused by a temperature rise in excess of the temperature difference limit value can effectively be avoided.

However, when the DC power source is controlled so that the temperature difference becomes less than or equal to the temperature difference limit value, but the temperature difference continues to rise, the control circuit suspends application of the DC voltage to the Peltier element from the DC power source. Conventionally, in the event that the Peltier element is placed in a high temperature state, application of the DC voltage is suspended by detecting such a high temperature state using a thermostat or the like. However, with the present invention, since the temperature difference is monitored, application of the DC voltage can be suspended prior to the occurrence of a faulty state in the Peltier element.

Further, the drive circuit may comprise a polarity reversing circuit that switches polarity of the DC voltage output from the DC power source, and applies the polarity-switched DC voltage to the Peltier element. In this case, when the polarity of the DC voltage that is applied to the Peltier element is switched by the polarity reversing circuit, the control circuit carries out a constant current control to maintain the direct current at a fixed value, and controls the DC power source so that a time constant of the direct current becomes longer. Accordingly, failure or deterioration in the performance of the Peltier element due to generation of an over-current every time that the polarity is switched, can be suppressed.

Further, the temperature adjustment apparatus may further comprise a temperature sensor that detects the temperature of the control object, and a temperature regulator that outputs an operating quantity to the control circuit for adjusting the temperature of the control object to a desired temperature. In this case, the parameter setting unit sets a temperature adjustment capability limiting value for limiting temperature adjustment capability of the Peltier element with respect to the control object. The control circuit limits the DC voltage and the direct current by controlling the drive circuit based on the operating quantity, the parameter, the DC voltage, the direct current, and the electromotive force, and further, by controlling the DC power source based on the temperature adjustment capability limiting value.

In the foregoing manner, the DC power source is a variable power source, which can arbitrarily set the magnitude of the DC voltage applied to the Peltier element, and is capable of changing the current that flows to the Peltier element. Therefore, by adjusting the DC voltage and the direct current, the heating capacity and the cooling capacity of the Peltier element can freely be changed.

Thus, as described above, by setting the temperature adjustment capability limiting value, and carrying out a power saving operation in which the DC voltage and the direct current are limited based on the set temperature adjustment capability limiting value, a reduction in power consumption (energy savings) of the temperature adjustment apparatus can be realized.

In this case, if the control circuit limits an output range of the DC voltage with respect to the operating quantity based on the temperature adjustment capability limiting value, the maximum power consumption of the temperature adjustment apparatus can be reduced.

Further, the control circuit may limit the DC voltage and the direct current until the temperature of the control object reaches a predetermined temperature corresponding to the temperature adjustment capability limiting value, whereas when the temperature of the control object reaches the predetermined temperature, limiting of the DC voltage and the direct current may be released.

Accordingly, in the case that the current temperature of the Peltier element deviates from the set temperature, for example, at a time of initial operation of the temperature adjustment apparatus or when the set temperature is modified by the parameter setting unit, etc., the temperature adjustment capability is limited while the temperature of the Peltier element changes over a time until the set temperature is reached, and the temperature of the Peltier element reaches and is stabilized at the set temperature, whereupon the limitation on the temperature adjustment capability is released. Thus, it is possible to realize a power savings during times that the temperature of the Peltier element is raised and lowered.

Further, the control circuit may further comprise a failure detecting unit, which judges that the Peltier element is suffering from a failure, in an event that the value of the direct current detected by the current detecting circuit deviates from characteristics of the DC voltage and the direct current based on a temperature difference between a heat-absorbing side and a heat-radiating side of the Peltier element corresponding to the electromotive force. Accordingly, failure of the Peltier element can be detected quickly and reliably. In this manner, by providing the failure detecting unit in the control circuit, from the DC voltage that is detected by the voltage detecting circuit, the failure detecting unit is capable of judging whether or not a malfunction in the output (DC voltage) of the DC power source (whether or not a failure of the DC power source) has taken place. Furthermore, the failure detecting circuit can compare the DC voltage detected by the voltage detecting circuit with the electromotive force detected by the electromotive force detecting circuit, and is capable of judging whether or not a failure has occurred in the polarity reversing circuit.

Furthermore, the electromotive force may be detected in the following manner. More specifically, the control circuit carries out detection of the electromotive force by the electromotive force detection circuit in a time band in which application of the DC voltage to the Peltier element from the DC power source is temporarily suspended, and upon completion of detection of the electromotive force, reapplies the DC voltage to the Peltier element from the DC power source. Additionally, in a case that application of the DC voltage and detection of the electromagnetic force are performed alternately, a detection time of the electromotive force is shorter than a time during which the DC voltage is applied.

Consequently, the influence of the heat of the heat-absorbing side and the heat-radiating side of the Peltier element, and the influence of a temperature change of the control object can be suppressed, so that the electromotive force can be measured correctly.

Further, if the electromotive force detecting circuit is a diode bridge circuit, in the case that the direction (polarity) of the electromotive force of the Peltier element undergoes a change, it is possible to measure the electromotive force of either polarity.

The above and other objects, features and advantages of the present invention will become more apparent from the following description when taken in conjunction with the accompanying drawings, in which a preferred embodiment of the present invention is shown by way of illustrative example.

DESCRIPTION OF THE PREFERRED EMBODIMENTS

A preferred embodiment of a temperature adjustment apparatus according to the present invention will be described below with reference to the accompanying drawings.

Configuration of the Present Embodiment

Figure 1:
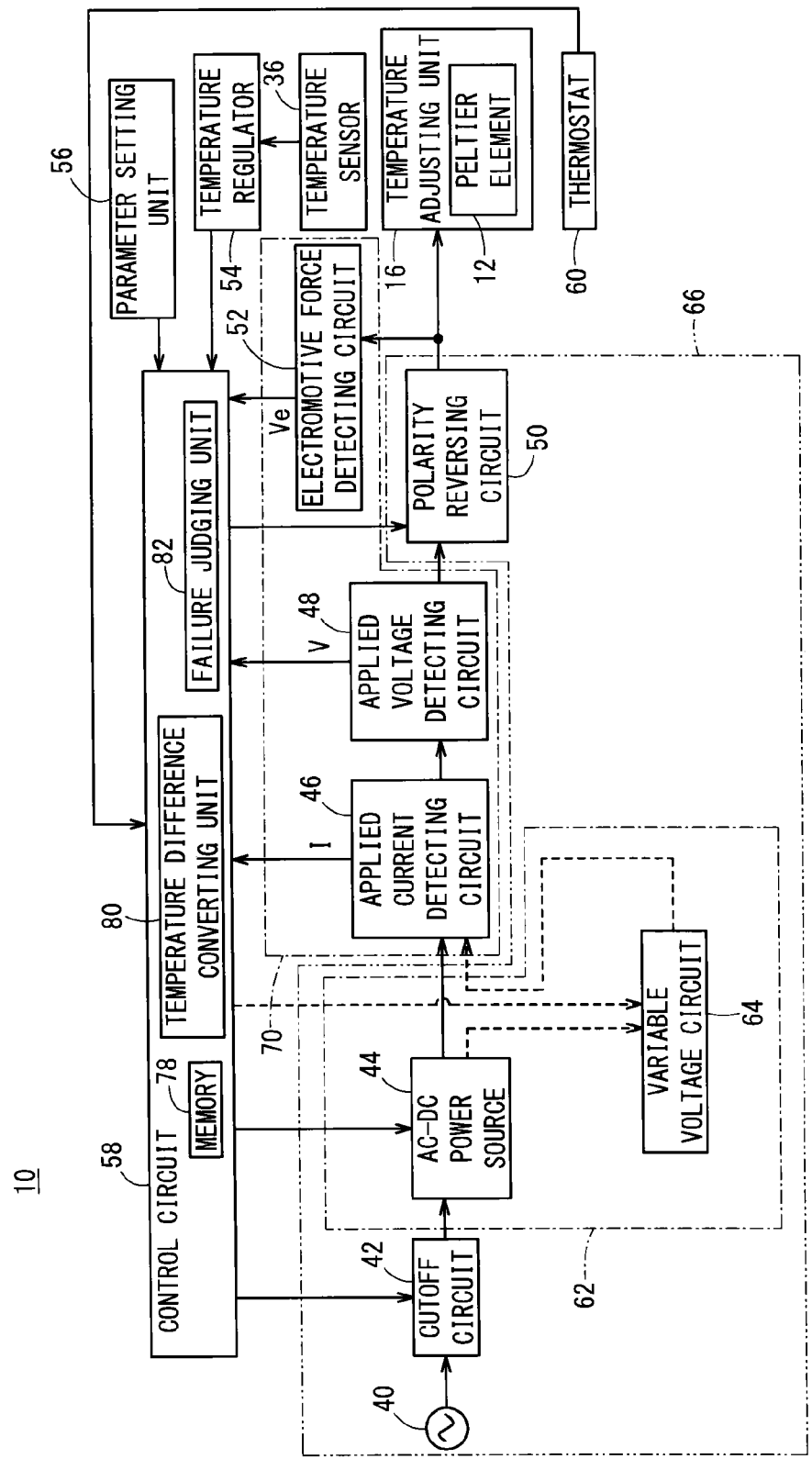
FIG. 1 is a block diagram of a temperature adjustment apparatus according to an embodiment of the present invention.
Figure 2:
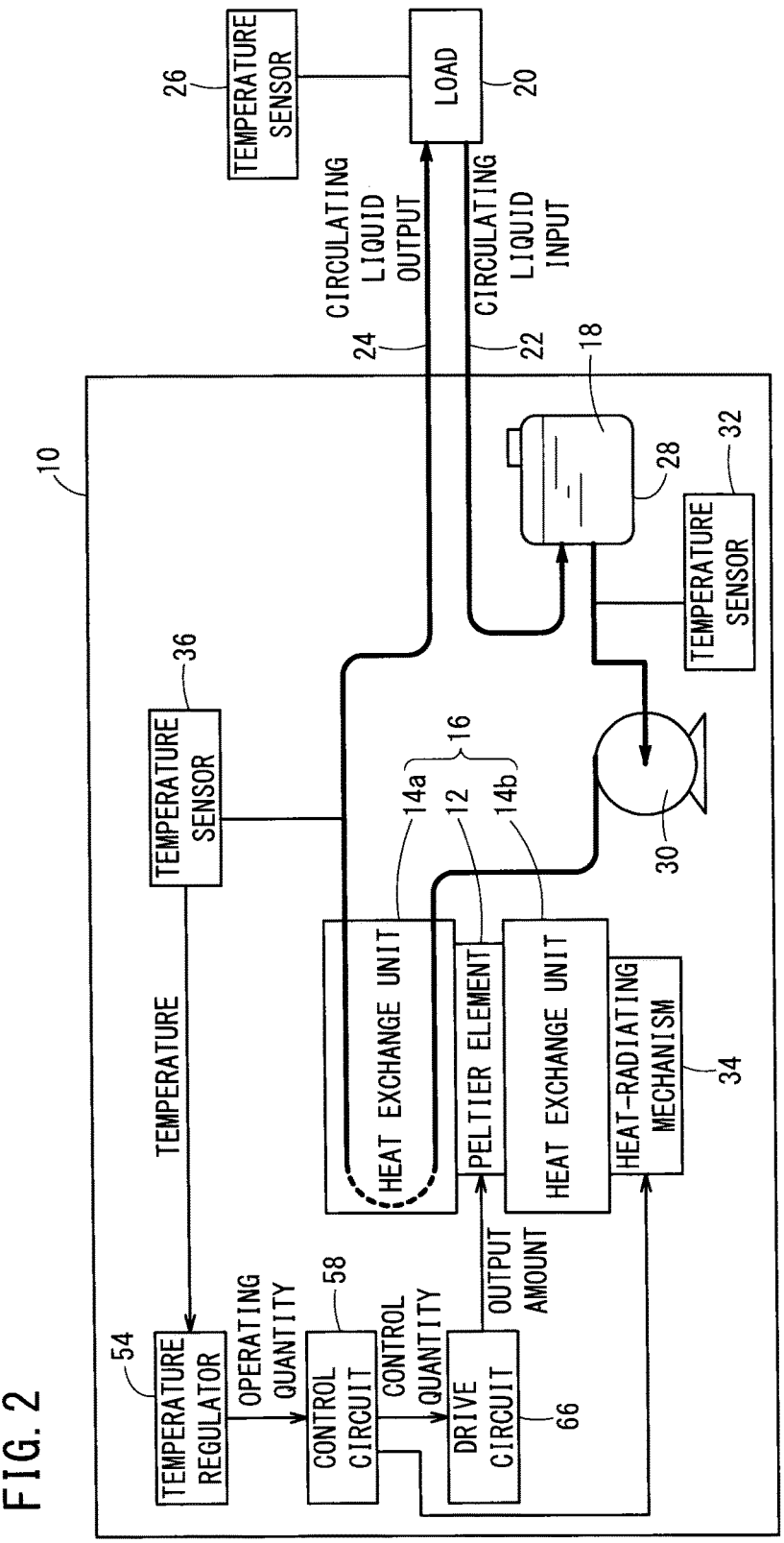
FIG. 2 is a structural block diagram showing heating and cooling of a circulating liquid by the temperature adjustment apparatus of FIG. 1.

A temperature adjustment apparatus 10 according to the present embodiment, as shown in FIGS. 1 and 2, comprises an apparatus for adjusting the temperature of a circulating liquid 18 to a desired temperature by heating or cooling the circulating liquid 18, which serves as a control object, by a temperature adjusting unit 16 including a Peltier element 12 and heat exchange units 14a, 14b.

As one example, in FIG. 2, a case is illustrated in which cooling is performed by the circulating liquid 18 in relation to heat that is generated by a load 20, such as a semiconductor manufacturing apparatus or the like for carrying out a predetermined process with respect to a semiconductor wafer. More specifically, between the temperature adjustment apparatus 10 and the load 20, there are connected an input path 22, by which the circulating liquid 18 having absorbed heat from the load 20 is input to the temperature adjustment apparatus 10, and an output path 24, by which the circulating liquid 18 after having been cooled in the temperature adjustment apparatus 10 is supplied again to the load 20. The temperature in the interior of the load 20 is detected by a temperature sensor 26.

A tank 28 and a pump 30 are disposed inside the temperature adjustment apparatus 10. The tank 28 temporarily stores the circulating liquid 18, which is supplied from the load 20 to the temperature adjustment apparatus 10 via the input path 22. The pump 30 delivers out to the temperature adjusting unit 16 the circulating liquid 18 that is stored in the tank 28. The temperature adjusting unit 16 is constituted from a Peltier element 12, which is interposed between two plate-like heat exchange units 14a, 14b, with the circulating liquid 18 being supplied to one of the heat exchange units 14a. The temperature of the supplied circulating liquid 18, which is supplied to the heat exchange unit 14a via the pump 30 from the tank 28, is detected by a temperature sensor 32.

By driving the Peltier element 12, in the temperature adjusting unit 16, one of the heat exchange units 14a functions as a heat-absorbing side (or a heating side), whereas the other heat exchange unit 14b functions as a heat-radiating side (or a cooling side). Heat of the circulating liquid 18, which is supplied to the heat exchange unit 14a, is transmitted from the heat exchange unit 14a through the Peltier element 12 to the other heat exchange unit 14b. An air-cooled or water-cooled heat-radiating mechanism 34 is connected to the heat exchange unit 14b. The heat that is transferred to the heat exchange unit 14b is radiated out and dissipated by the heat-radiating mechanism 34.

In this manner, the circulating liquid 18, which has been cooled by the heat exchange unit 14a, is supplied to the load 20 through the outlet path 24, and is used again to cool the interior of the load 20. The temperature of the cooled circulating liquid 18 is detected by a temperature sensor 36 disposed in the outlet path 24.

Consequently, with the configuration shown in FIGS. 1 and 2, the circulating liquid 18 circulates between the temperature adjustment apparatus 10 and the load 20, the circulating liquid 18, which has absorbed heat generated in the interior of the load 20 is cooled by the temperature adjustment apparatus 10, and by supplying the cooled circulating liquid again to the load 20, the interior of the load 20 is maintained at a predetermined temperature (i.e., is kept in a constant temperature state).

Next, a description shall be made concerning the interior structure of the temperature adjustment apparatus 10 for controlling the Peltier element 12.

In addition to the above-described structural elements, the temperature adjustment apparatus 10 further includes an AC power source 40, a cutoff circuit 42, an AC-DC power source 44 (hereinafter referred to as a "converter 44"), an applied current detecting circuit 46, an applied voltage detecting circuit 48, a polarity reversing circuit 50, an electromotive force detecting circuit 52, a temperature regulator 54, a parameter setting unit 56, a control circuit 58, and a thermostat 60.

The AC power source 40 supplies an AC voltage having a predetermined amplitude to the converter 44 through the cutoff circuit 42. The cutoff circuit 42 serves to cutoff the connection between the AC power source 40 and the converter 44 if an abnormality occurs in the temperature adjustment apparatus 10. The converter 44 converts the AC voltage supplied from the AC power source 40 into a DC voltage V (hereinafter referred to as an "applied voltage V") to output, based on a control signal from the control circuit 58, which is implemented in the CPU of the temperature adjustment apparatus 10.

In this case, assuming that the converter 44 is a variable power source 62, which is capable of varying the value of the applied voltage V based on the control signal, an applied voltage V of a voltage value responsive to the control signal is output from the converter 44.

On the other hand, if the converter 44 is a fixed power source that outputs a DC voltage of a predetermined voltage value, the temperature adjustment apparatus 10 may also include a variable voltage circuit 64 connected to the output side of the converter 44. In this case, as shown in broken lines in FIG. 1, the variable voltage circuit 64 converts the DC voltage output from the converter 44 into a DC voltage having a voltage value responsive to the control signal from the control circuit 58, and then outputs the converted DC voltage as the applied voltage V. Accordingly, in the case that the converter 44 is a fixed power source, the variable power source 62 is made up from the converter 44 and the variable voltage circuit 64.

In FIG. 1, the converter 44 and the variable voltage circuit 64 are shown in the variable power source 62. As described above, however, it is a matter of course that the variable voltage circuit 64 is unnecessary if the converter 44 is the variable power source 62.

The applied current detecting circuit 46 detects a direct current I (hereinafter referred to as an "applied current I") that flows in the Peltier element 12 when the applied voltage V output from the variable power source 62 is applied to the Peltier element 12 through the applied voltage detecting circuit 48 and the polarity reversing circuit 50, and outputs the detection result to the control circuit 58. The applied voltage detecting circuit 48 also detects the applied voltage V that is applied to the Peltier element 12 from the variable power source 62 through the polarity reversing circuit 50, and outputs the detection result to the control circuit 58.

Figure 3:
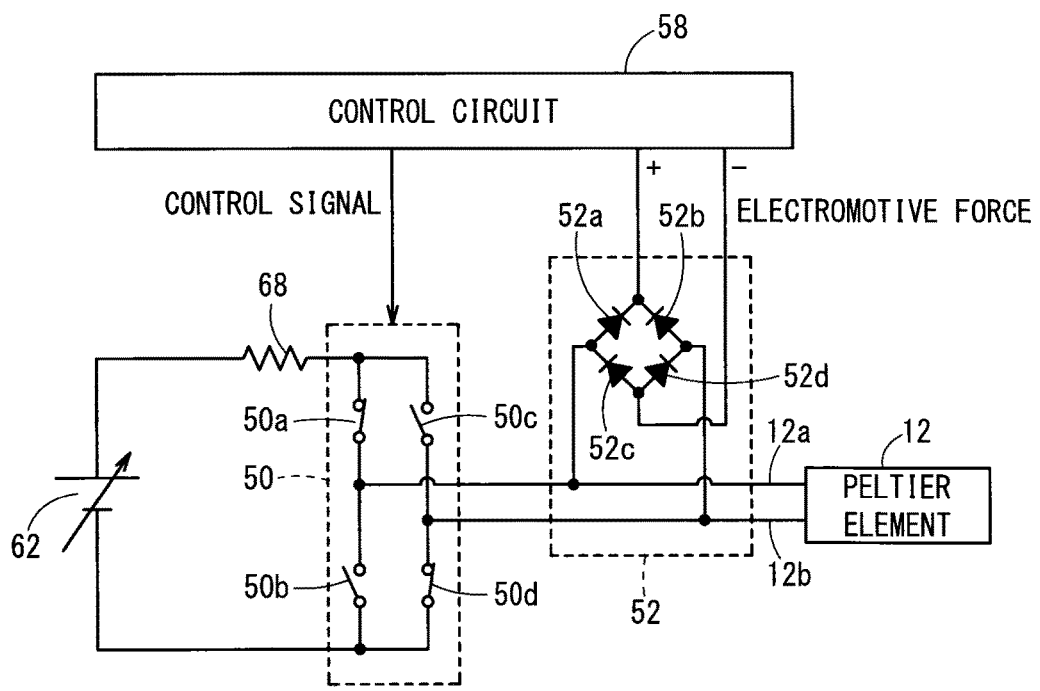
FIG. 3 is a circuit diagram showing measurement of an electromotive force by an electromotive force detecting circuit of FIG. 1.

As shown in FIG. 3, the polarity reversing circuit 50 is a bridge circuit, in which two series-connected switches 50a, 50b, and two series-connected switches 50c, 50d are connected in parallel, and the Peltier element 12 is connected thereto via a wiring connected between the two switches 50a, 50b, and a wiring connected between the two switches 50c, 50d. In this case, by turning ON and OFF the switches 50a to 50d of the polarity reversing circuit 50 based on control signals from the control circuit 58, the polarity of the applied voltage V supplied from the variable power source 62 is switched and then output to the Peltier element 12.

Accordingly, a drive circuit 66, which causes an applied current I to flow in accordance with the applied voltage V applied to the Peltier element 12, is constituted from the AC power source 40, the cutoff circuit 42, the variable power source 62 (the converter 44, or the converter 44 and the variable voltage circuit 64), and the polarity reversing circuit 50.

Further, by turning OFF all of the switches 50a to 50d based on a control signal from the control circuit 58, the polarity reversing circuit 50 can suspend supply of the applied voltage V to the Peltier element 12 from the variable power source 62. Furthermore, by repeatedly turning ON and OFF the two switches 50a, 50d or the two switches 50b, 50c, based on a control signal from the control circuit 58, the polarity reversing circuit 50 is capable of carrying out a PWM control with respect to the DC voltage which is continuous over time, supplied from the variable power source 62. In this case, the polarity reversing circuit 50 applies a pulsed voltage, which is generated in accordance with the PWM control, as the applied voltage V to the Peltier element 12.

As shown in FIG. 3, by turning the two switches 50a, 50d ON, whereas the other two switches 50b, 50c are turned OFF, one of the terminals 12a of the Peltier element 12 is connected to the plus side of the variable power source 62, and another of the terminals 12b is connected to the minus side of the variable power source 62. Further, in FIG. 3, a resistor 68, which is connected between the plus side of the variable power source 62 and the polarity reversing circuit 50, is indicative of the resistance of the applied current detecting circuit 46 and the applied voltage detecting circuit 48.

The electromotive force detecting circuit 52 is a diode bridge circuit that is constituted from four diodes 52a to 52d, which are connected to two wirings connected between the polarity reversing circuit 50 and the respective terminals 12a, 12b of the Peltier element 12. In this case, the two serial-connected diodes 52a, 52b, and the two serial-connected diodes 52c, 52d are connected in parallel with respect to the two wirings connected between the polarity reversing circuit 50 and the respective terminals 12a, 12b of the Peltier element 12. Further, the control circuit 58 is connected to a wiring, which is connected between the two diodes 52a, 52b, and to another wiring, which is connected between the two diodes 52c, 52d.

In addition, in the electromotive force detecting circuit 52, when all of the switches 50a to 50d that make up the polarity reversing circuit 50 are turned OFF, and the connection between the variable power source 62 and the Peltier element 12 is cutoff, the voltage generated between the respective terminals 12a, 12b of the Peltier element 12, i.e., the electromotive force Ve (thermoelectric force) of the Peltier element 12 is detected, and the detection result is output to the control circuit 58.

Figure 4:
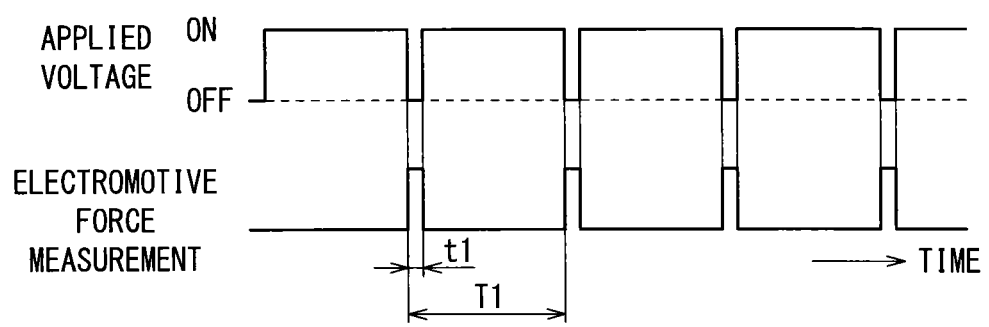
FIG. 4 is a timing chart showing a relationship between an application time of an applied voltage and a measurement time of the electromotive force.

More specifically, as shown in FIG. 4, by supplying a control signal to the polarity reversing circuit 50 from the control circuit 58, in the case that a time interval t1 (a time band during which supply of the applied voltage V to the Peltier element 12 is suspended) is provided in which all of the switches 50a to 50d are turned OFF within the interval of the period T1, the electromotive force detecting circuit 52 detects the electromotive force Ve within the time interval t1. In this case, within the period T1, preferably, the relationship (T1−t1)>>t1 is established between the time interval (T1−t1) during which the applied voltage V is applied to the Peltier element 12, and the time interval t1 during which the electromotive force Ve is detected. Consequently, all of the switches 50a to 50d are turned OFF and driving of the Peltier element 12 is temporarily suspended, and after detection of the electromotive force Ve by the electromotive force detecting circuit 52 is completed, driving of the Peltier element 12 can be resumed immediately.

In addition, a state detector 70 that detects the applied current I, the applied voltage V, and the electromotive force Ve, which serve to define the electrical state of the Peltier element 12, is constituted by the applied current detecting circuit 46, the applied voltage detecting circuit 48, and the electromotive force detecting circuit 52.

Figure 5:
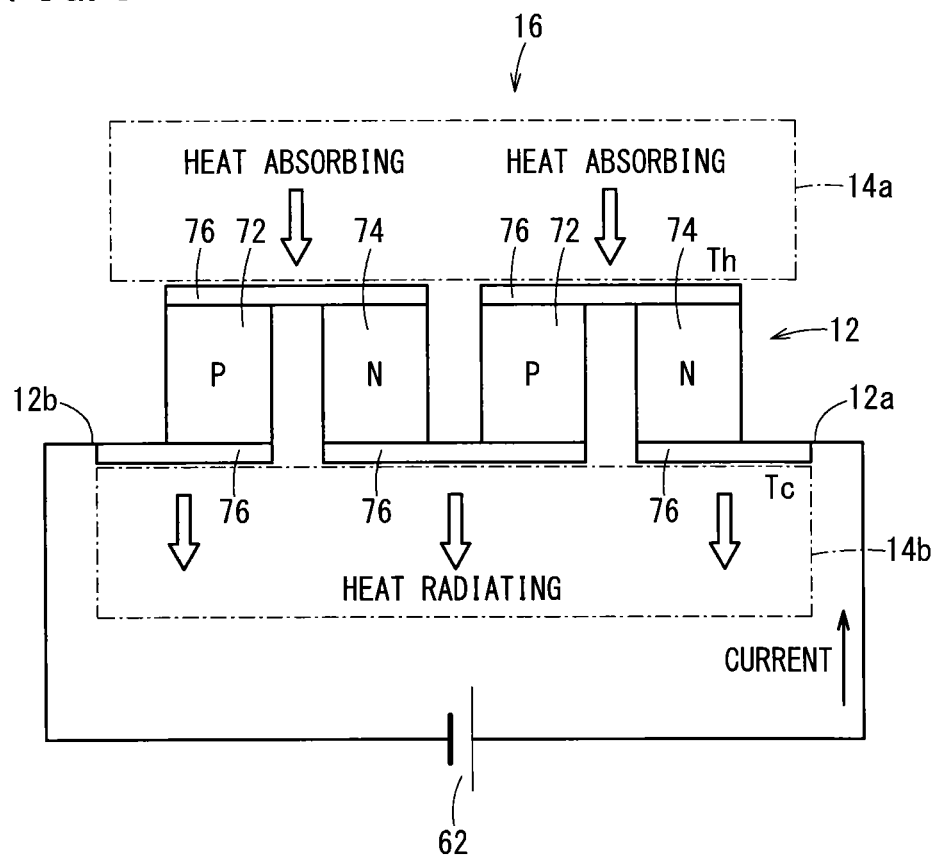
FIG. 5 is a circuit diagram showing the principles of heat radiation and heat absorption performed by the Peltier element of FIG. 1.

As shown in FIG. 5, the Peltier element 12 includes P-type semiconductors 72 and N-type semiconductors 74, which are connected alternately and in series through metal plates 76. In this case, for example, if a plus side of the variable power source 62 is connected to the N-type semiconductors 74 and the minus side thereof is connected to the P-type semiconductors 72, the heat exchange unit 14a side of the Peltier element 12 operates as a heat-absorbing side that absorbs heat from the circulating liquid 18, whereas the heat-exchange unit 14b side of the Peltier element 12 operates as a heat-radiating side, which is capable of radiating out the absorbed heat to the heat exchange unit 14b. The structure and operations of the Peltier element 12 are well known, and therefore, a description of such detailed features is omitted.

Figure 6:
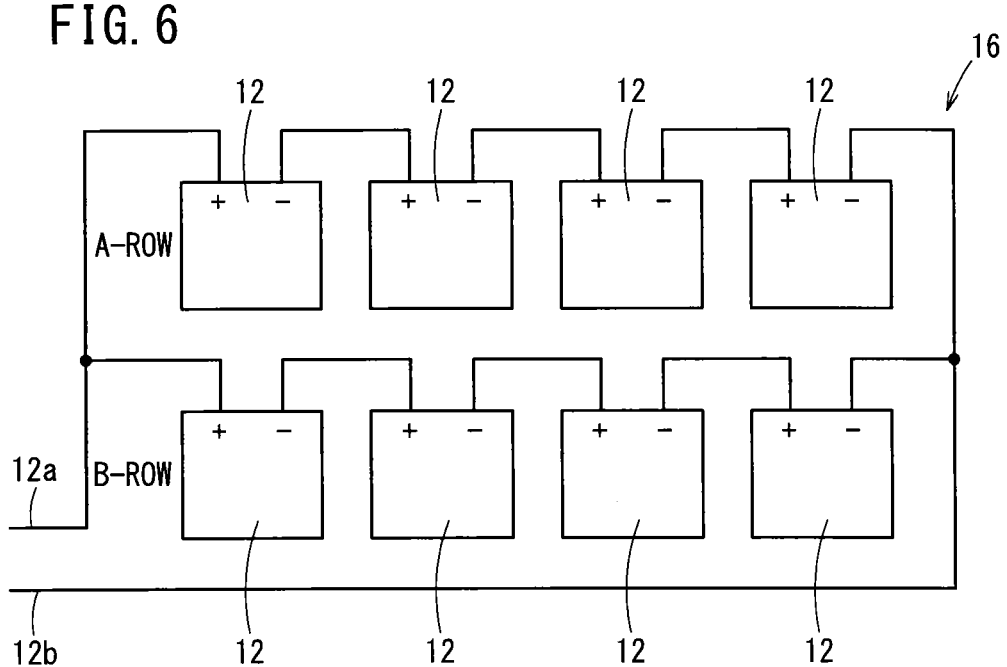
FIG. 6 is a circuit diagram showing a connected state of a plurality of Peltier elements.

In the actual temperature adjusting unit 16, a plurality of interconnected Peltier elements 12 are utilized. For example, as shown in FIG. 6, a structure may be used in which four Peltier elements 12 are connected in series to form an A-row, and four Peltier elements 12 are connected in series to form a B-row, with the respective Peltier elements 12 of the A-row and the respective Peltier elements 12 of the B-row being connected in parallel.

The temperature regulator 54 generates an operating quantity for controlling the temperature of the circulating liquid 18, which serves as the control object, to a desired temperature, based on the temperature of the circulating liquid 18 (after cooling thereof) as detected by the temperature sensor 36, and outputs the generated operating quantity to the control circuit 58.

The parameter setting unit 56 serves as an input means such as operating buttons or the like disposed on a surface of the temperature adjustment apparatus 10. Through operations of a user, various types of information (parameters) are input and can be stored in a memory 78 of the control circuit 58.

In this case, the parameters that are set by the parameter setting unit 56 are parameters related to the operation of the Peltier element 12, which are defined in the following manner, for example.

(1) Maximum voltage values Vtmax, Vcmax, which are maximum values of the applied voltage V that can be applied to the Peltier element 12. Vtmax is a maximum voltage value at a time that the heat exchange unit 14a side of the Peltier element 12 operates as a heating side or a heat-absorbing side, and Vcmax is a maximum voltage value at a time that the heat exchange unit 14a side of the Peltier element 12 operates as a cooling side or a heat-radiating side.

(2) Current limit values Itlim, Iclim, which are maximum values of the applied current I that can flow to the Peltier element 12. Itlim is a current limit value at a time that the heat exchange unit 14a side of the Peltier element 12 operates as a heating side or a heat-absorbing side, and Iclim is a current limit value at a time that the heat exchange unit 14a side of the Peltier element 12 operates as a cooling side or a heat-radiating side.

(3) A temperature difference limit value $\Delta$Tlim, which is a permissible value of a temperature difference $\Delta$T ($\Delta$T=Th−Tc) between a temperature of the heat-absorbing side (heat-absorbing side temperature Th) and a temperature of the heat-radiating side (heat-radiating side temperature Tc) of the Peltier element 12 corresponding to the electromotive force Ve.

(4) A power saving value (temperature adjustment capability limit value) for limiting the temperature adjustment capability (heating capacity, cooling capacity) of the Peltier element 12 with respect to the circulating liquid 18.

The aforementioned parameters are provided as examples only. It goes without saying that the user can operate the parameter setting unit 56 to make appropriate settings for other parameters apart from those mentioned above.

In addition to the memory 78, the control circuit 58 further comprises a temperature difference converting unit 80 and a failure judging unit (failure detecting unit) 82. Additionally, the control circuit 58 controls the cutoff circuit 42, the variable power source 62, and the polarity reversing circuit 50, based on the operating quantity input from the temperature regulator 54, the various parameters stored in the memory 78, the applied current I detected by the applied current detecting circuit 46, the applied voltage V detected by the applied voltage detecting circuit 48, and the electromotive force Ve detected by the electromotive force detecting circuit 52.

More specifically, the temperature difference converting unit 80 converts the electromotive force Ve detected by the electromotive force detecting circuit 52 into the temperature difference $\Delta$T. In addition, in the case that the applied voltage V is applied to the Peltier element 12 from the variable power source 62, and if the absolute value of the applied current I detected by the applied current detecting circuit 46 exceeds the absolute value of the current limit values Itlim, Iclim ($|I|>|Itlim|$ or $|I|>|Iclim|$), the control circuit 58 switches the control signal supplied to the variable power source 62. More specifically, the control circuit 58 switches the variable voltage control signal, which makes the value of the applied voltage V variable, to a constant current operation, for thereby holding the applied voltage V at a predetermined voltage value (the voltage limit value Vtlim, Vclim) while maintaining the applied current I at the current limit value Itlim or Iclim. Further, if the absolute value of the applied current I becomes less than or equal to the absolute value of the current limit values Itlim, Iclim ($|I|\leq|Itlim|$ or $|I|<|Iclim|$), the control circuit 58 returns from the constant current operation to the variable voltage control, and supplies the original variable voltage control signal to the variable power source 62.

Further, in the case that the temperature difference $\Delta$T exceeds the temperature difference limit value $\Delta$Tlim ($\Delta$T>$\Delta$Tlim), the applied voltage V is lowered by the control circuit 58 controlling the variable power source 62 so that the temperature difference $\Delta$T becomes less than or equal to the temperature difference limit value $\Delta$Tlim.

Furthermore, regardless of whether the variable power source 62 is controlled so that the temperature difference $\Delta$T becomes less than or equal to the temperature difference limit value $\Delta$Tlim, if the temperature difference $\Delta$T continues to rise, the control circuit 58 suspends application of the applied voltage V to the Peltier element 12 from the variable power source 62. In this case, the control circuit 58 may control the cutoff circuit 42 to cutoff the connection between the AC power source 40 and the converter 44, or may switch OFF all of the switches 50a to 50d of the polarity reversing circuit 50.

Further, in the event that the polarity reversing circuit 50 is controlled to switch the polarity of the applied voltage V that is applied to the Peltier element 12, the control circuit 58 carries out a constant current control to maintain the applied current I at a fixed value, and controls the variable power source 62 so that a time constant of the applied current I becomes longer.

Moreover, in the case that power consumption is to be lowered by the temperature adjustment apparatus 10 implementing a power saving operation, the control circuit 58 may control the variable power source 62 based on the power saving value that is stored in the memory 78, whereby the value of the applied voltage V output from the variable power source 62 and the value of applied current I that flows to the Peltier element 12 may be limited.

In this case, by the control circuit 58 limiting an output range of the applied voltage V with respect to the operating quantity based on the power saving value, the power consumption of the temperature adjustment apparatus 10 can be reduced.

Further, the control circuit 58 limits the applied voltage V and the applied current I until the temperature of the circulating liquid 18 reaches a predetermined temperature corresponding to the power saving value. The temperature of the circulating liquid 18 changes over time toward the predetermined temperature, and when the circulating liquid 18 reaches the predetermined temperature, limiting of the applied voltage V and the applied current I is released.

Further, the characteristics of the applied voltage V and the applied current I are changed corresponding to the temperature difference $\Delta$T. Thus, when the characteristics of the applied voltage V and the applied current I for each of respective temperature differences $\Delta$T are stored beforehand in the memory 78 by the parameter setting unit 56, in the case that the applied current I detected by the applied current detecting circuit 46 deviates significantly from the aforementioned characteristics, the failure judging unit 82 may determine that the Peltier element 12 is suffering from a failure.

In the temperature adjustment apparatus 10, moreover, in the event that the temperature of the heat exchange unit 14b side (heat-releasing side) of the Peltier element 12 is in a high temperature state which is greater than or equal to a predetermined temperature, the thermostat 60 detects an overheated condition of the Peltier element 12, and based on the detection result from the thermostat 60, the control circuit 58 may operate the cutoff circuit 42 so that the connection between the AC power source 40 and the converter 44 is cutoff.

Operations and Advantages of the Present Embodiment

The temperature adjustment apparatus 10 according to the present embodiment is constructed basically as described above. Next, operations and advantages of the temperature adjustment apparatus 10 will be described below with reference to FIGS. 7 through 19. In the following explanations, as needed, reference may also be made to FIGS. 1 through 6.

Differences Between the Present Embodiment and the Conventional Technique

Figure 7:
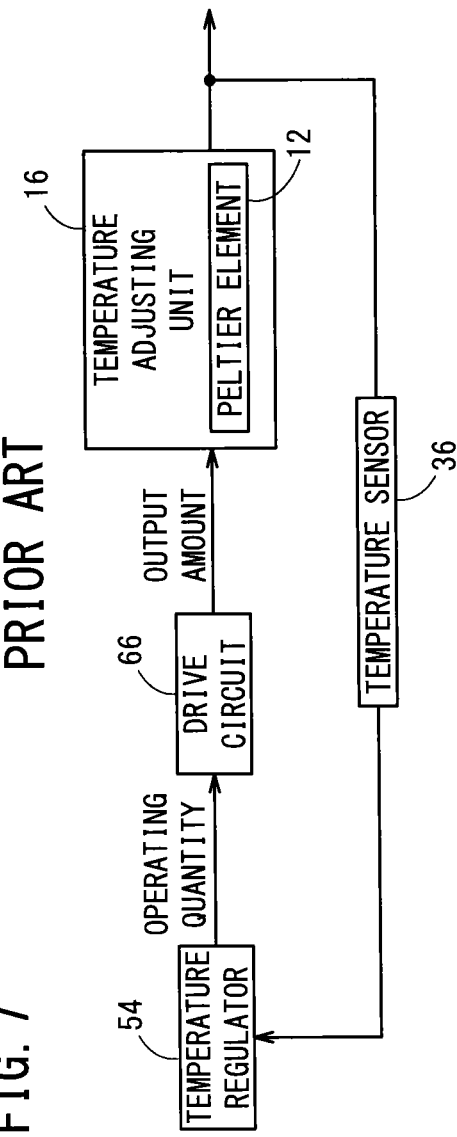
FIG. 7 is a block diagram showing controls carried out by the conventional technique with respect to a Peltier element.
Figure 8:
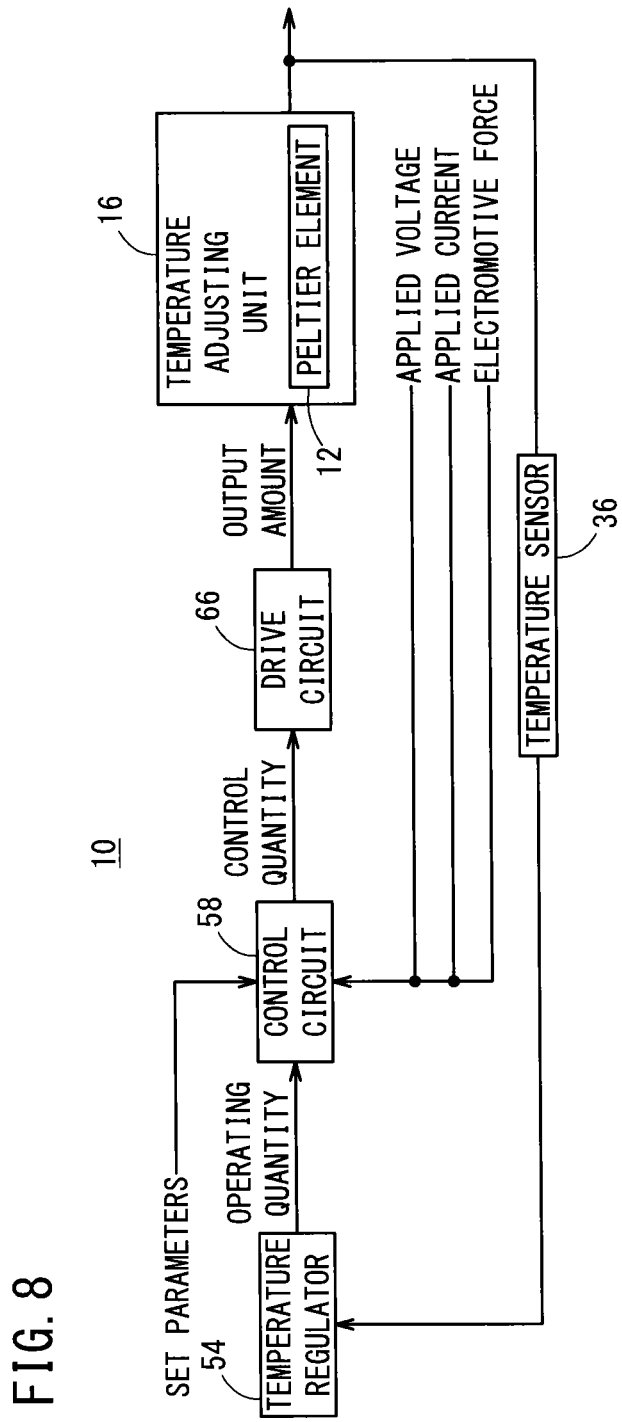
FIG. 8 is a block diagram showing controls carried out by the temperature adjustment apparatus of FIG. 1 with respect to the Peltier element.

FIG. 7 is a block diagram showing controls carried out by the conventional technique with respect to the Peltier element 12. FIG. 8 is a block diagram showing controls carried out by the present embodiment with respect to the Peltier element 12. In FIG. 7, the same reference characters are used to designate features thereof that are the same as those of the present embodiment.

According to the conventional technique, the drive circuit 66 drives the Peltier element 12 at an output amount (i.e., an applied voltage (pulse voltage) according to a PWM control, a continuous applied voltage or an applied current) that is proportional to (dependent on) the operating quantity of the temperature regulator 54. More specifically, in the conventional technique, the output amount is based on the temperature of the circulating liquid 18, which is detected by the temperature sensor 36, and the electrical state (the applied voltage V, the applied current I, the electromotive force Ve) of the Peltier element 12 is not reflected in the output amount. Therefore, with the conventional technique, the electrical state of the Peltier element 12 is not taken into the control with respect to the Peltier element 12, which means that the control (open loop control) is adopted such that the electrical state is not reflected on the Peltier element 12.

In contrast thereto, with the present embodiment, the operating quantity of the temperature regulator 54, the parameters set by the parameter setting unit 56, and the electrical state of the Peltier element 12 detected by the state detector 70 are extracted and taken into the control circuit 58. Consequently, the control circuit 58 calculates a desired output amount using the extracted operating quantity, the parameters, and the electrical state of the Peltier element 12, determines a control quantity corresponding to the calculated output amount, and controls the drive circuit 66 based on the determined control quantity. In other words, with the present embodiment, taking into consideration the electrical state of the Peltier element 12, the control (feedback control) is adopted such that the electrical state is reflected on the Peltier element 12.

Basic Control Method for Controlling the Peltier Element 12 in the Present Embodiment In the temperature adjustment apparatus 10 according to the present embodiment, based on the temperature of the circulating liquid 18 detected by the temperature sensor 36, the temperature regulator 54 determines an operating quantity so that the temperature of the circulating liquid 18 remains constant, and the determined operating quantity is output to the control circuit 58. The control circuit 58 then determines a control quantity based on the operating quantity from the temperature regulator 54 or the like. Based on the control signal from the control circuit 58, the drive circuit 66 generates an output amount (applied voltage V, applied current I) for driving the Peltier element 12 corresponding to the operating quantity.

The control method by which the drive circuit 66 drives the Peltier element 12 can broadly be divided into the following three control methods: (1) a voltage control method capable of varying the DC voltage, which changes continuously over time, (2) a current control method capable of varying the direct current, which changes continuously over time, and (3) a PWM control method with respect to a fixed voltage of a constant value with respect to the passage of time. However, when compared in terms of cost and circuit size, the cost and required size of the circuitry increase in the following order: PWM control method<voltage control method<current control method.

Figure 9:
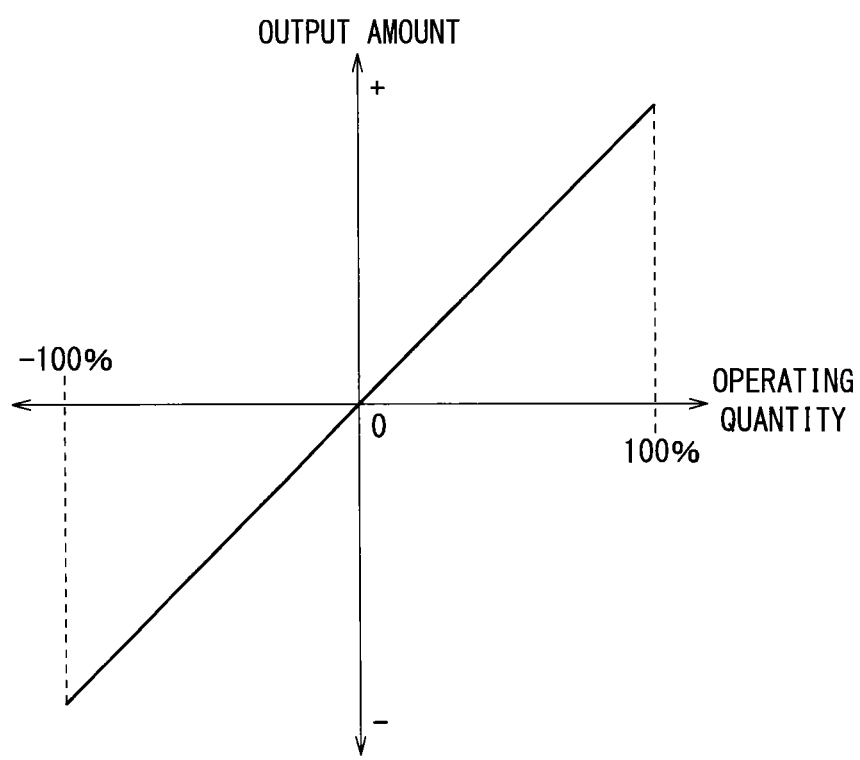
FIG. 9 is a graph showing a relationship between an operating quantity and an output amount.

FIG. 9 is a graph showing an exemplary relationship between the operating quantity and the output amount. In the graph, the output amount is proportional to (depends on) the operating quantity. Further, changing of the operating quantity is defined from −100% to +100%, so as to correspond to a heating operation (0% to +100%) or a cooling operation (−100% to 0%) by the Peltier element 12. On the other hand, in accordance with the control method applied with respect to the Peltier element 12, the output amount is expressed as a magnitude of the applied voltage V or the applied current I. In this case, the "+" and "−" signs in relation to the output amount represent the orientation of the polarity of the applied voltage V or the applied current I applied to the Peltier element 12. In the foregoing manner, for continuously varying the output amount with respect to the operating quantity, the above-described voltage control method or current control method is adopted, and circuitry is required that is capable of continuously varying the applied voltage V or the applied current I.

Figure 10:
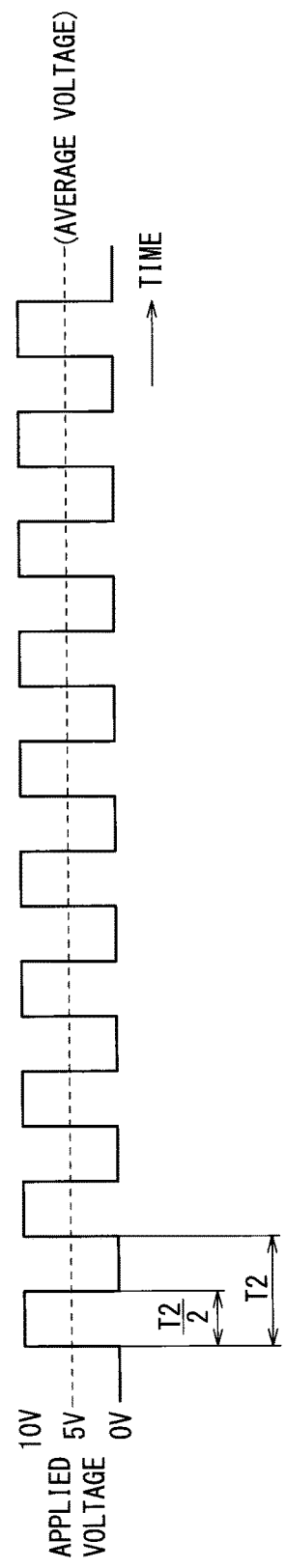
FIG. 10 is a timing chart showing an applied voltage generated in accordance with a PWM control.

In contrast thereto, the PWM control method is a control method in which a pulsed voltage (applied voltage V) is output by implementing a PWM control with respect to a fixed voltage, and an average voltage is determined from the ON timing and the OFF timing of such a fixed voltage. In this case, for implementing the PWM control method, a simple circuit configuration is adopted. For example, as shown in FIG. 10, a voltage having an amplitude of 10 V is turned on an off at a 50% duty ratio, thereby resulting in an effective average voltage of 5 V.

Description of the First Advantage of the Present Embodiment

A first advantage of the present embodiment will be described with reference to FIGS. 11 through 15.

The first advantage is an effect by which the heating capacity and the cooling capacity of the temperature adjustment apparatus 10 can be improved, by implementing a control in which a failure or degradation in performance of the Peltier element 12 does not occur, and more specifically, by carrying out a feedback control that takes into consideration the electrical state of the Peltier element 12 and that the electrical state is reflected on the Peltier element 12.

A recommended standard value for the drive voltage (applied voltage V) or the drive current (applied current I) of the Peltier element 12 generally is of a degree of 60% to 70% of the maximum standard value. In this case, from the manufacturer of the Peltier element 12, a cautionary notice is issued to the effect that a drive voltage or a drive current of the Peltier element 12 should be used which is 60% to 70% of the maximum standard value.

This is because, if the Peltier element 12 is used at the maximum standard value, depending on the conditions under which the Peltier element 12 is used, cases tend to occur in which the maximum standard value actually is exceeded. For example, if the drive voltage is operated at its maximum standard value, dependent on the temperature difference ΔT that takes place between the heat-absorbing side and the heat-radiating side of the Peltier element 12, cases occur in which the drive current exceeds the maximum standard value. In this manner, by exceeding the maximum standard value, a failure or deterioration in performance of the Peltier element 12 can easily take place.

Therefore, with the conventional temperature adjustment apparatus in which the Peltier element 12 is used, the heating capacity and the cooling capacity of the temperature adjusting unit 16 including the Peltier element 12 and the heat exchange units 14a, 14b are designed at the standard values recommended by the manufacturer, and the capacity obtainable by such standard values establishes the product performance of the temperature adjustment apparatus.

However, in practice, depending on the usage conditions of the Peltier element 12 (the temperature difference $\Delta T$ between the heat-absorbing side and the heat-radiating side of the Peltier element 12, the control method applied with respect to the Peltier element 12, etc.), cases also exist in which there is an available margin with respect to the maximum standard value of the Peltier element 12. Accordingly, if it were possible to draw out the capability of the Peltier element 12 to the maximum limit, the heating capacity and the cooling capacity of the temperature adjustment apparatus 10 could be improved, an improvement in product performance could be realized, and the number of Peltier elements 12 (the number of connected Peltier elements 12 shown in FIG. 6) could be reduced.

Thus, according to the present embodiment, a control (feedback control reflecting the electrical state of the Peltier element 12) is performed, in which the applied voltage V, the applied current I, and (the electromotive force Ve corresponding to) the temperature difference $\Delta T$ are detected, and in which values thereof are monitored and managed such that deterioration in performance of the Peltier element 12 does not occur. Additionally, by making use of the Peltier element 12 up to the limit of the maximum standard values (permissible values of the applied voltage V, the applied current I, and the temperature difference $\Delta T$) thereof, the heating capacity and the cooling capacity of the temperature adjustment apparatus 10 are drawn out to the maximum limit.

Causes for deterioration in performance of the Peltier element 12 are discussed below.

Although the Peltier element 12 is an element that is used to elicit a temperature difference $\Delta T$ between the heat-absorbing side and the heat-radiating side, on the other hand, the temperature difference $\Delta T$ also is a cause of thermal stress in the Peltier element 12. In this case, if the amount of heat generated on the heat-radiating side (amount of heat= (the amount of heat absorbed on the heat-absorbing side)+ (the power consumption of the Peltier element 12)) is not sufficiently dissipated, thermal stress increases, and cracks occur in the device structure, leading to destruction of the Peltier element 12. Further, if the applied voltage V or the applied current I exceed their maximum standard values, similarly, the device structure of the Peltier element 12 may be destroyed.

In other words, assuming that the Peltier element 12 is utilized with careful attention paid to the following content items (1) and (2), and such that the maximum standard values (test data validated as maximum standard values) are not exceeded, the heating capacity and the cooling capacity of the Peltier element 12 can be drawn out to their maximum limit.

(1) The Peltier element 12 is used such that dissipation of heat is carried out sufficiently on the heat-radiating side, and the temperature difference between the heat-absorbing side and the heat-radiating side is kept less than or equal to the maximum value (maximum temperature difference value $\Delta T$max).

(2) Thermal cycle fatigue due to rapid polarity reversal or the like is not imparted to the Peltier element 12.

Thus, keeping the aforementioned points (1) and (2) in mind, with the temperature adjustment apparatus 10, a control is carried out for the purpose of management and monitoring of the following items (A) through (D).

(A) Management of temperature difference $\Delta T$ (operate the Peltier element 12 at or below the maximum temperature difference $\Delta T$max as a set value).

(B) Control at the time of polarity switching (suppression of the applied voltage V and the applied current I).

(C) Limitation on the maximum standard values (suppression of applied voltage V and applied current I).

(D) Limitation imposed when the heat-radiating side of the Peltier element 12 is abnormal.

Next, with reference to the following points (i) to (vi), a description shall be given concerning a detailed control method for realizing the items mentioned above.

(i) As an initial operation, various parameters are set in the control circuit 58 from the parameter setting unit 56. In this case the following items (a) through (c) are used as set parameters.

(a) The maximum applied voltage Vtmax on the heating side of the Peltier element 12 (the maximum value of the applied voltage V supplied to the Peltier element 12 when the circulating liquid 18 is heated) and the maximum applied voltage Vcmax on the cooling side of the Peltier element 12 (the maximum value of the applied voltage V supplied to the Peltier element 12 when the circulating liquid 18 is cooled).

(b) The maximum current limit value Itlim on the heating side of the Peltier element 12 (the maximum value of the applied current I that can flow to the Peltier element 12 when the circulating liquid 18 is heated) and the maximum current limit value Iclim on the cooling side of the Peltier element 12 (the maximum value of the applied current I that can flow to the Peltier element 12 when the circulating liquid 18 is cooled).

(c) The temperature difference limit value $\Delta T$lim of the temperature difference $\Delta T$ (permissible values of the temperature difference $\Delta T$ of the Peltier element 12, the value of the electromotive force Ve corresponding to such permissible values) (or the electromotive force limit value Velim corresponding to the temperature difference limit value $\Delta T$lim).

The parameters are predetermined based on designed values and actual measured data of the temperature adjustment apparatus 10 in which the Peltier element 12 is used, and according to the present embodiment, controls are performed based on such parameters.

Further, with the present embodiment, there are two principal cases of interest, namely, a case in which the applied voltage V and the applied current I are supplied to the Peltier element 12 to heat the circulating liquid 18, and a case in which the applied voltage V and the applied current I are supplied to the Peltier element 12 to cool the circulating liquid 18. For this reason, the polarities of the applied voltage V and the applied current I are reversed from one another in the case of heating (the "+" side shown in FIG. 11) and in the case of cooling (the "−" side shown in FIG. 11).

(ii) The applied voltage V (the applied voltage V applied continuously over time), which is proportional to the operating quantity from the temperature regulator 54, is applied to the Peltier element 12 from the polarity reversing circuit

50. In this case, the method by which the Peltier element 12 is driven is a variable voltage control based on the characteristics shown in FIG. 9, in which the applied voltage V can be applied to the Peltier element 12 up to the maximum applied voltages +Vtmax, Vcmax, which are set as parameters (set values).

Figure 11:
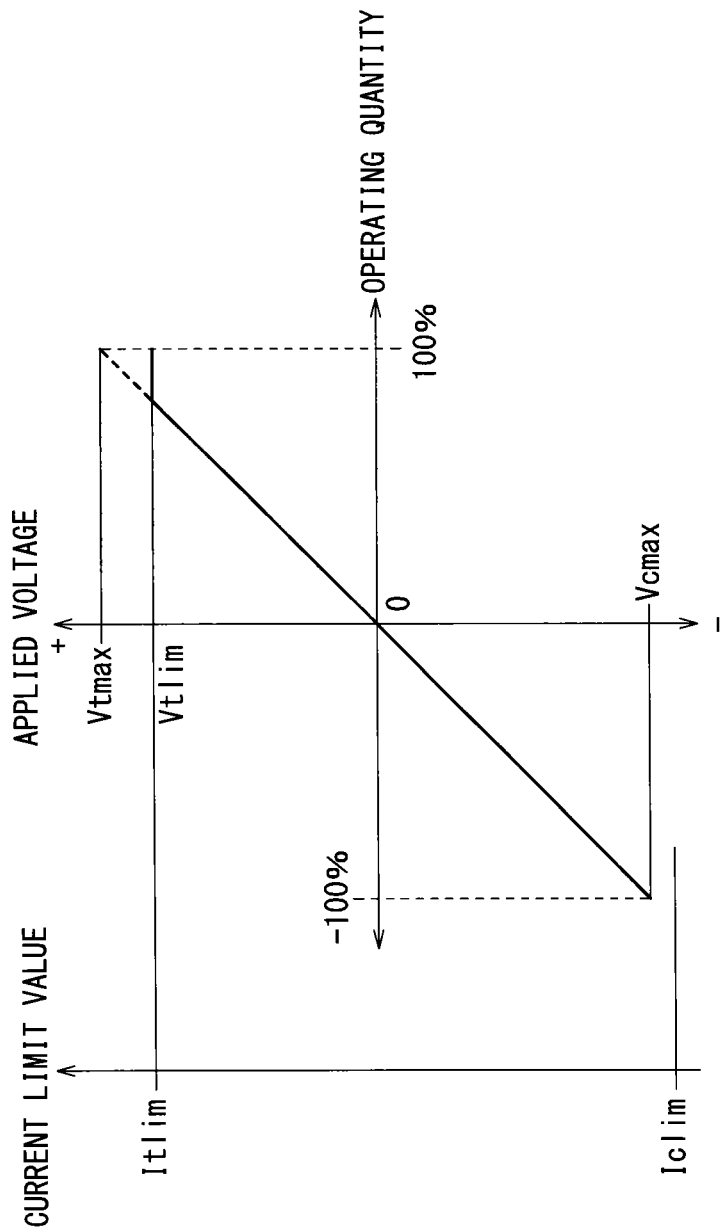
FIG. 11 is a graph showing a limitation imposed on the applied voltage.

(iii) The applied current I that flows to the Peltier element 12 is monitored, and if the absolute values of the current limit values Itlim, Iclim, which are set values, are exceeded, then as shown in FIG. 11, the control method is switched from the variable voltage control to the constant current operation, in which the applied voltage V is held at the voltage limit value Vtlim, Vclim with respect to the operating quantity, while the applied current I is maintained at the current limit value Itlim, Iclim. On the other hand, if the applied current I returns to a value that is less than or equal to the current limit value Itlim, Iclim, the variable voltage control is restored.

In FIG. 11, a case is shown in which, if the applied current I on the heating side exceeds the current limit value Itlim, the control is switched from the variable voltage control to the constant current operation, whereas on the cooling side, with the applied current being less than or equal to the absolute value of the current limit value Iclim, the variable voltage control is carried out. More specifically, with the example of FIG. 11, in accordance with the temperature difference ΔT, a case is shown in which, even if the absolute value of the applied voltage V is the same, the applied currents I that flow to the Peltier element 12 at the heating side and the cooling side thereof are different.

The Peltier element 12 possesses characteristics such that, accompanying a temperature difference ΔT between a heat-absorbing side and a heat-radiating side thereof, the resistance value and the heat-absorbing amount (electromotive force Ve) of the Peltier element 12 are changed. Therefore, even if the same applied voltage V is applied to the Peltier element 12, in accordance with the temperature state, cases occur in which the applied current I that flows through the Peltier element 12 goes over the maximum standard value. For preventing this situation, with the present embodiment, as described above, the temperature adjustment apparatus 10 is configured such that, if the applied current I flows at or above the absolute value of the current limit value Itlim, Iclim, the control is switched to the constant current operation, so that the applied current I does not flow at or above the aforementioned absolute value.

(iv) The electromotive force Ve of the Peltier element 12 is monitored, and using the temperature difference converting unit 80 of the control circuit 58, the electromotive force Ve, which is detected by the electromotive force detecting circuit 52, is converted into the temperature difference ΔT. In addition, as shown in FIG. 12, the control circuit 58 performs a limiting control on the applied voltage V so that the temperature difference ΔT does not exceed the temperature difference limit value ΔTlim.

Figure 12:
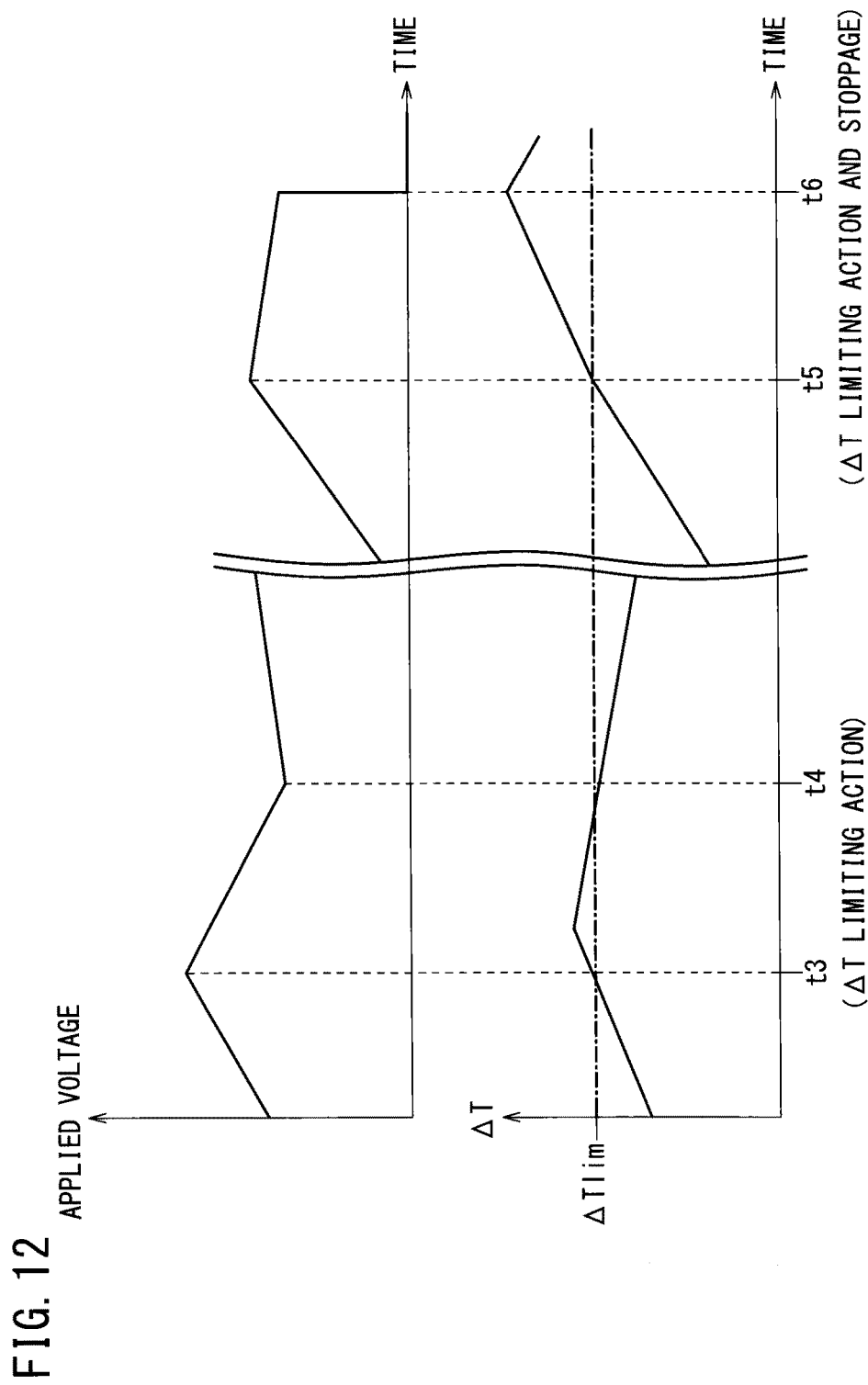
FIG. 12 is a timing chart showing the limitation imposed on the applied voltage.

More specifically, in FIG. 12, at time t3, when the temperature difference ΔT exceeds the temperature difference limit value ΔTlim, the control circuit 58 controls the variable power source 62, and a voltage limiting control is implemented to cause the value of the applied voltage V to decrease. Accordingly, after time t4, the temperature difference ΔT decreases to a value that is less than or equal to the temperature difference limit value ΔTlim.

The electromotive force Ve is detected by the detection method shown in FIGS. 3 and 4. Further, if the temperature difference ΔT is lowered to a value that is less than or equal to the temperature difference limit value ΔTlim, the limiting action on the temperature difference ΔT is released.

(v) After time t5, in spite of a fact that the limiting actions on the temperature difference ΔT described in item (iv) above are implemented, in the event that the temperature difference ΔT continues to rise, the failure judging unit 82 judges that a fault has occurred on the heat-radiating side or the heat-absorbing side of the Peltier element 12. In addition, based on the judgment result of the failure judging unit 82, at time t6, the control circuit 58 stops supply of the applied voltage V with respect to the Peltier element 12.

Conventionally, a high temperature abnormality on the heat-radiating side is detected by the thermostat 60, whereupon supply of the applied voltage V is halted. In contrast thereto, with the present embodiment, the temperature difference ΔT is monitored, and supply of the applied voltage V is halted in advance. Accordingly, with the present embodiment, the same function as that of the conventional method by means of the thermostat 60 can be implemented. Further, suspension of the applied voltage V can be carried out by turning OFF all of the switches 50a to 50d of the polarity reversing circuit 50, or by interrupting the connection between the AC power source 40 and the converter 44 with the cutoff circuit 42.

(vi) In the case that the heating operation and the cooling operation are switched as a result of modifying the temperature settings or the like, the switching operation is carried out softly (slowly) so that an over-current does not flow to the Peltier element 12.

Figure 13:
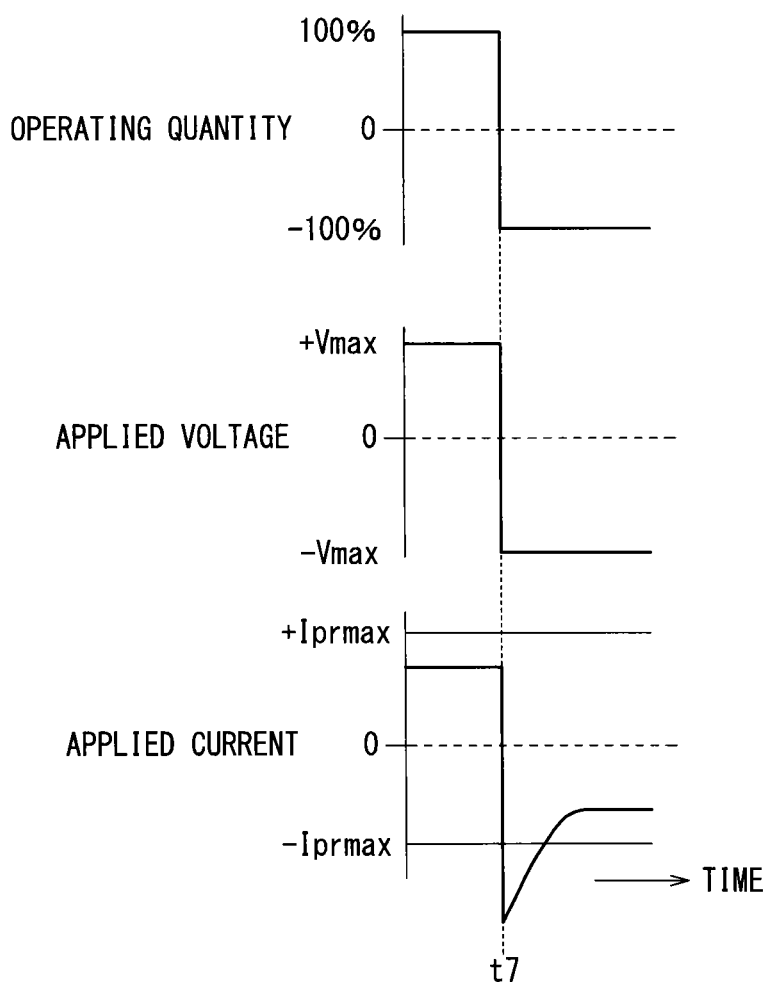
FIG. 13 is a timing chart showing temporal changes of an operating quantity, an applied voltage and an applied current at a time when the polarity thereof is switched, according to the conventional technique.

More specifically, conventionally, using a control method in which the output amount is proportional to (dependent on) the operating quantity, when the polarity of the applied voltage V is switched, for example at time t7 in FIG. 13, in the case that the operating quantity is switched from +100% to −100% and the applied voltage V is switched from +Vmax to −Vmax, an over-current is generated, which is greater than the absolute value of the maximum standard value −Iprmax on the minus side. When such an abrupt change of the applied current I occurs, and an applied current I is generated that exceeds the absolute value of the maximum standard value −Iprmax, thermal stresses are imparted inadvertently to the Peltier element 12, leading to a concern that deterioration in performance or a failure of the Peltier element 12 may take place.

Figure 14:
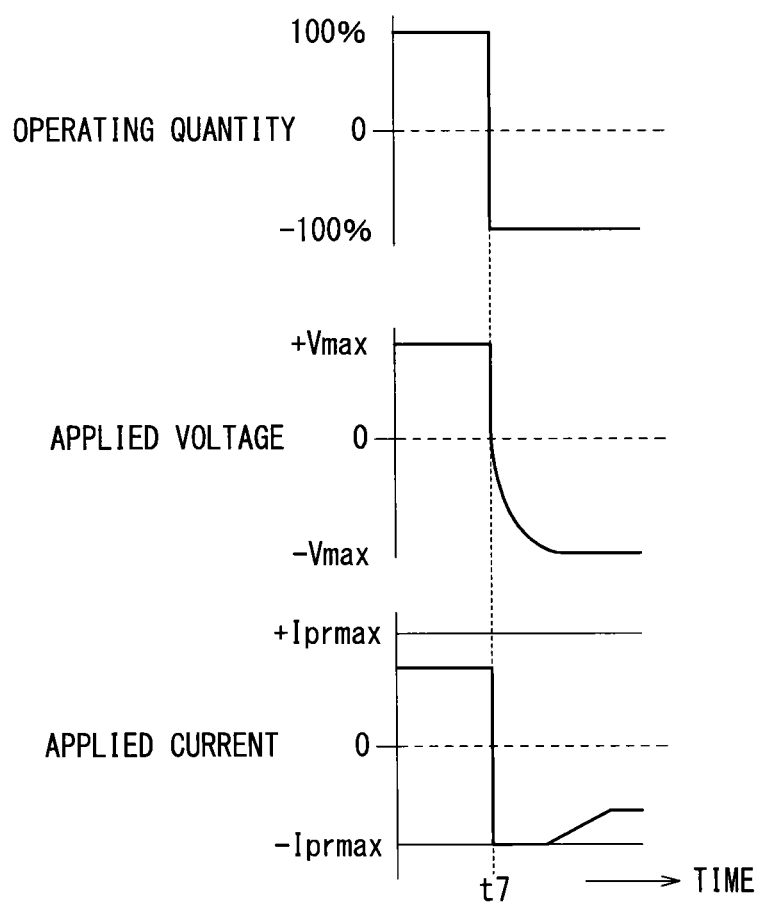
FIG. 14 is a timing chart showing temporal changes of an operating quantity, an applied voltage and an applied current at a time when the polarity thereof is switched, according to a current control method.

Thus, as shown in FIG. 14, when the polarity of the applied voltage V is switched at time t7, it may be considered to apply the constant current method, so that the applied current I is limited by the maximum standard value −Iprmax.

However, even with such a constant current method, since the applied current I flows suddenly and all at once up to the maximum standard value −Iprmax immediately after time t7, similar to the case of FIG. 13, there is a concern that deterioration in performance or a failure of the Peltier element 12 may take place.

Figure 15:
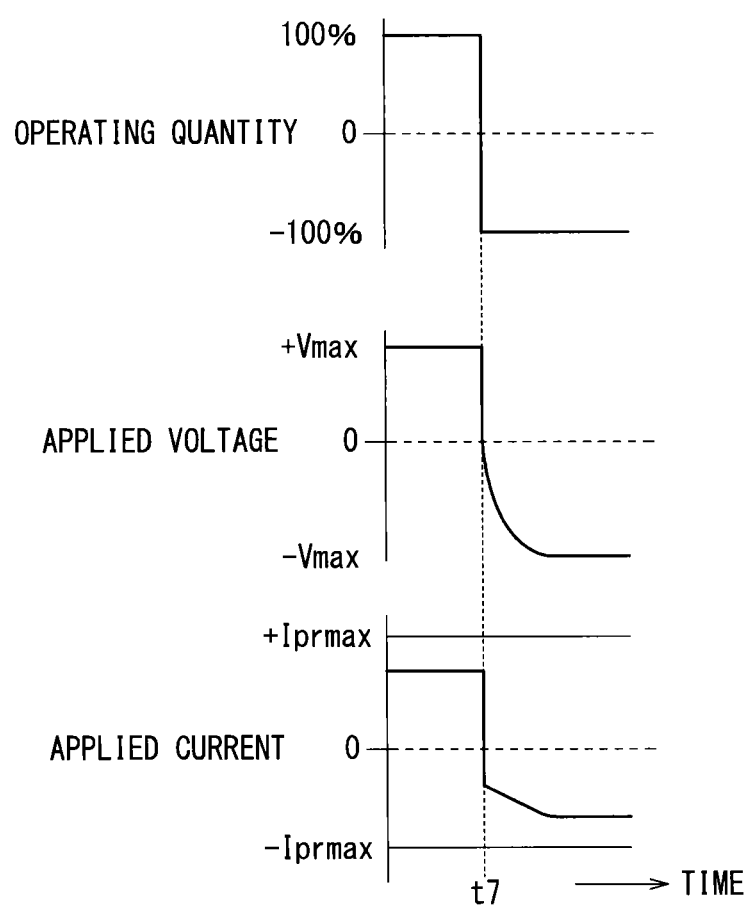
FIG. 15 is a timing chart showing temporal changes of an operating quantity, an applied voltage and an applied current at a time when the polarity thereof is switched, according to the present embodiment.

In contrast thereto, with the present embodiment, as shown in FIG. 15, for mitigating the occurrence of thermal stresses or an abrupt change in current with respect to the Peltier element 12 immediately after time t7, the constant current method is combined with a method in which the time constant of the applied current I is lengthened. Thus, after the polarity of the applied voltage V is switched at time t7, a soft switching method (slow switching method) is adopted in which the applied current I that flows to the Peltier element 12 increases gradually over time.

More specifically, in the case that only the time constant of the applied current I is limited, if the set time is short, an over-current is generated by the state of the Peltier element 12. On the other hand, if the time constant is set to a long value, the temperature change of the Peltier element 12 is delayed. Thus, according to the present embodiment, a soft switching method is adopted, in which the time constant method and the constant current method are used in combination, in order to compensate for the shortcoming of the time constant method as well as the shortcoming of the constant current method.

As described above, as a first advantage of the present invention, in the temperature adjustment apparatus 10 in which the Peltier element 12 is used, a new type of control method is adopted, whereby the heating capability and the cooling capability of the Peltier element 12 are improved. The new control method is a method in which failure or degradation in performance of the Peltier element 12 does not occur, and more specifically, in which a control (feedback control) is carried out that takes into consideration control content related to the electrical state of the Peltier element 12, and that reflects the electrical state on the Peltier element 12.

Description of the Second Advantage of the Present Embodiment

As described above, with the present embodiment, the magnitudes of the applied voltage V and the applied current I that are supplied to the Peltier element 12 can be set arbitrarily. Stated otherwise, the heating capacity and the cooling capacity of the temperature adjustment apparatus 10 can be varied freely. Thus, according to the present embodiment, as an added value function that makes use of this feature, a second advantage is brought about in the form of an energy-saving function due to power savings.

Conventionally, with a temperature adjustment apparatus in which a Peltier element 12 is used, since there is no function to adjust the heating capacity and the cooling capacity, the following two problems (1) and (2) tend to occur.

(1) The product (temperature adjustment apparatus) cannot be used at a site (factory) that is equipped only with a power supply facility that is below the maximum power consumption (current requirement) of the product, although in practice, there are situations in which the product can be used at such a site, assuming that the heating capacity and the cooling capacity of the product are suppressed, for example, to about 50% of the maximum power consumption.

(2) It is desirable for the power consumption of the product (temperature adjustment apparatus) to be reduced during an interval up to the time at which the set temperature thereof becomes stabilized.

Thus, with the present embodiment, the aforementioned problems (1) and (2) are solved by the following items (A) and (B).

(A) A power saving function is provided that limits the heating capacity and the cooling capacity of the temperature adjustment apparatus 10 as a product, whereby the maximum power consumption (current) of the temperature adjustment apparatus 10 is lowered. More specifically, by suppressing the heating capacity and the cooling capacity to predetermined values, it is not necessary to supply power greater than that required for the aforementioned capacities.

(B) A function is provided to limit the heating capacity and the cooling capacity until the temperature of the circulating liquid 18 becomes stabilized (reaches a predetermined temperature).

To realize the aforementioned functions (A) and (B), the user inputs limiting values (power saving values, etc.) for the heating capacity and the cooling capacity by operating the parameter setting unit 56 of the temperature adjustment apparatus 10. More specifically, as power saving functions, there are (i) a mode for limiting the heating capacity and the cooling capacity in a uniform fashion, and (ii) a mode for limiting the heating capacity and the cooling capacity during a rise or a fall in temperature, and until the temperature of the circulating liquid 18 becomes stabilized after a modification to the temperature thereof.

More specifically, by limiting (lowering) the heating capacity and the cooling capacity, the voltage V applied to the Peltier element 12 is lowered, and the power consumed by the Peltier element 12 decreases. Consequently, since the power consumption of the converter 44 decreases, the power (current) consumption of the temperature adjustment apparatus 10 as a whole can also be decreased.

In a heat exchanger product such as the temperature adjusting unit 16 or the like, during the time that the temperature thereof undergoes a change, for example, in the case that the current temperature and the set temperature of the circulating liquid 18 are significantly separated from one another, or in the case that a large thermal load is input, there is a tendency for the temperature adjusting unit 16 to be operated at its maximum heating capacity and maximum cooling capacity. As a result, the power consumption of the temperature adjustment apparatus 10 as a whole reaches a maximum value.

In contrast thereto, in a state in which the temperature of the circulating liquid 18 has been stabilized, in the absence of a large thermal load being input to the temperature adjusting unit 16, a small amount of power consumption is sufficient.

Figure 16:
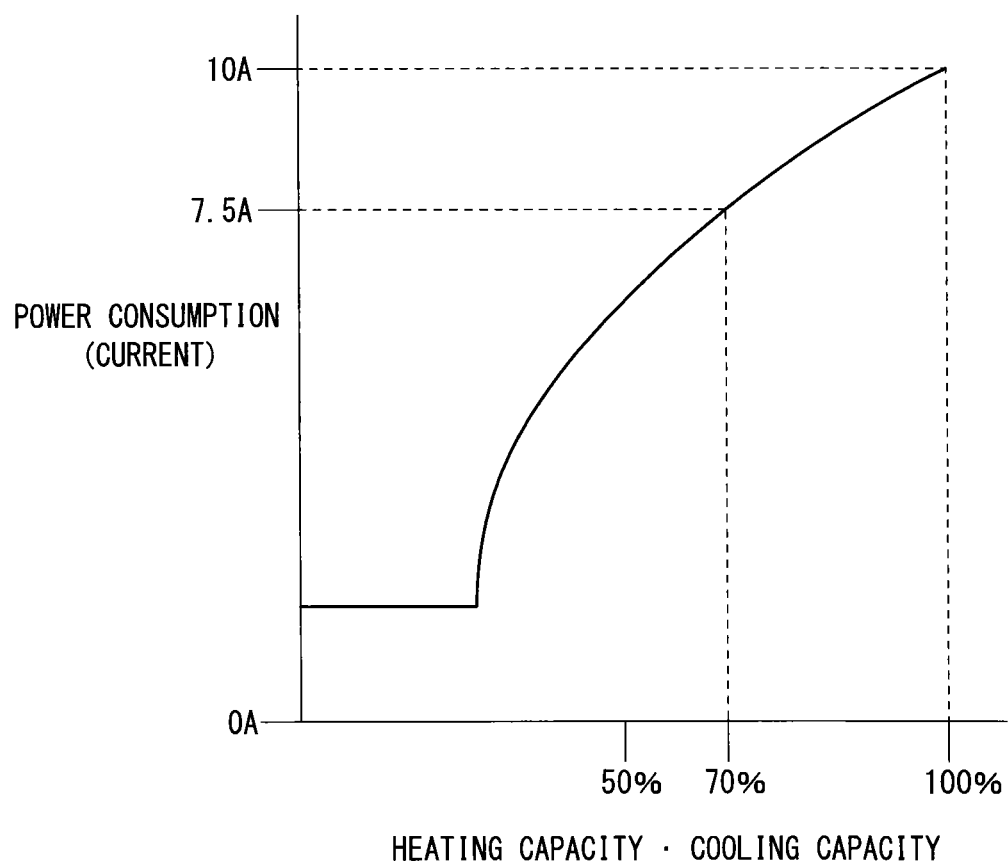
FIG. 16 is a graph showing a relationship between heating capacity and cooling capacity, and power consumption of the temperature adjustment apparatus of FIG. 1.

FIG. 16 is a view showing an example of a relationship between heating capacity and cooling capacity, and power consumption of the temperature adjustment apparatus 10, in which, assuming the heating capacity and the cooling capacity are lowered, power consumption also decreases.

Descriptions shall now be presented of illustrative examples (Inventive Example 1 and Inventive Example 2) for solving the above problems (1) and (2).

Inventive Example 1

Inventive example 1 is an illustrative example for solving the above-described problem (1).

For example, a case shall be described in which, in a laboratory or the like, two temperature adjustment apparatuses 10 are used, and the maximum power capacity available in the laboratory is 16 A (amperes).

Referring to FIG. 16, in the case that two temperature adjustment apparatuses 10 are used, and assuming that the maximum current consumption of one of the temperature adjustment apparatuses 10 is 10 A, simple calculation, it can be understood that a power capacity of 20 A is needed in the laboratory. However, if the heating capacities and cooling capacities of the two temperature adjustment apparatuses 10 are set at 70% and the apparatuses are used, maximum current consumption of one apparatus becomes 7.5 A and the total current consumption of the two apparatuses is 15 A. Accordingly, even with the power capacity (16 A) of the aforementioned condition, the two temperature adjustment apparatuses 10 can be used in the laboratory without tripping a circuit breaker or the like.

Inventive Example 2

In a factory or the like in which multiple temperature adjustment apparatuses 10 are used, when employment of the apparatuses is initiated, if the temperature adjustment apparatuses 10 are operated all at once, each one of the temperature adjustment apparatuses 10 is operated at the maximum heating capacity and the maximum cooling capacity until the circulating liquid 18 reaches the target temperature. As a result, the power consumption of each of the temperature adjustment apparatuses 10 is at the maximum value, and if the number of apparatuses used is large, the peak power of the factory as a whole leaps upward. Thus, if a mode is used to limit the heating capacity and the cooling capacity during ascent and descent of temperature, the peak power can be suppressed, and the circulating liquid 18 can reach the target temperature. However, when such a mode is used, since the apparatuses are not operated at their maximum heating capacity and cooling capacity, the time to reach the target temperature is delayed.

Among the above-described power saving modes, modes (B) and (ii) serve as modes that place a limitation on the heating capacity and the cooling capacity only at times that the temperature of the circulating liquid 18 is being raised and lowered, whereas when the temperature is stable, the restriction is released. Accordingly, with modes (B) and (ii), raising and lowering of the temperature with respect to a large thermal load can be handled.

Figure 17:
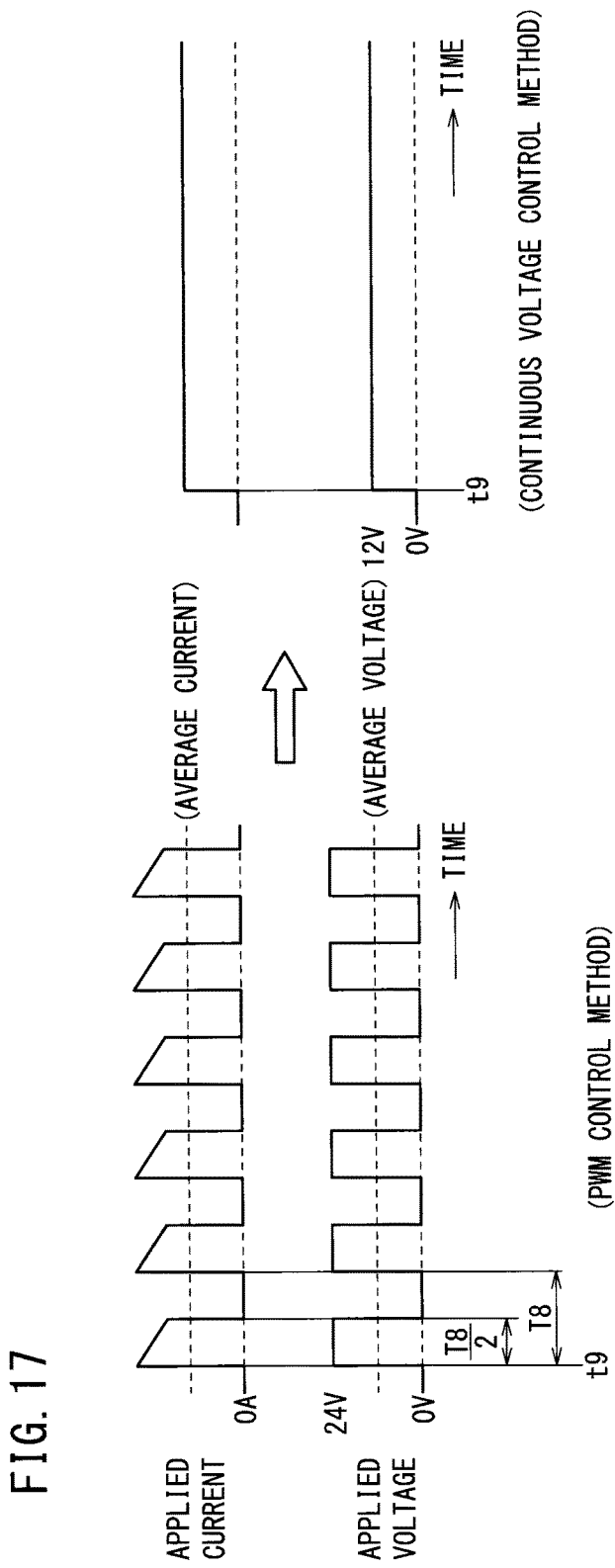
FIG. 17 is a timing chart showing differences between a PWM control method and the present embodiment.

Incidentally, with any of the power saving functions (A) and (B) ((i) and (ii)) discussed above, since the applied voltage V is applied to the Peltier element 12 in accordance with a variable voltage control (a voltage control method in which the applied voltage V is applied continuously over time), as shown in FIG. 17, the peak of the applied current I (peak current) at the side of the variable power source 62 can be limited completely.

On the other hand, in the case of a PWM control method, since a peak current flows to the side of the power source every time that the applied voltage V is applied to the Peltier element 12, the peak current cannot be limited completely, even though the average current is the same as in the case of the variable voltage control method.

Further, as shown in FIG. 17, in the case of a PWM control method, a pulsed voltage at a duty ratio of 50% and a period T8 is applied repeatedly to the Peltier element 12 from time t9. Further, with the variable voltage control method of the present embodiment, a DC voltage, which corresponds to the average voltage of the PWM control, is applied as the applied voltage V to the Peltier element 12 from time t9.

Further specific details of the control methods implemented by the aforementioned modes (A) and (B) will be described with reference to FIGS. 18 and 19.

Mode (A) is a method by which the maximum value Vmax of the applied voltage V applied to the Peltier element 12 is lowered.

Figure 18:
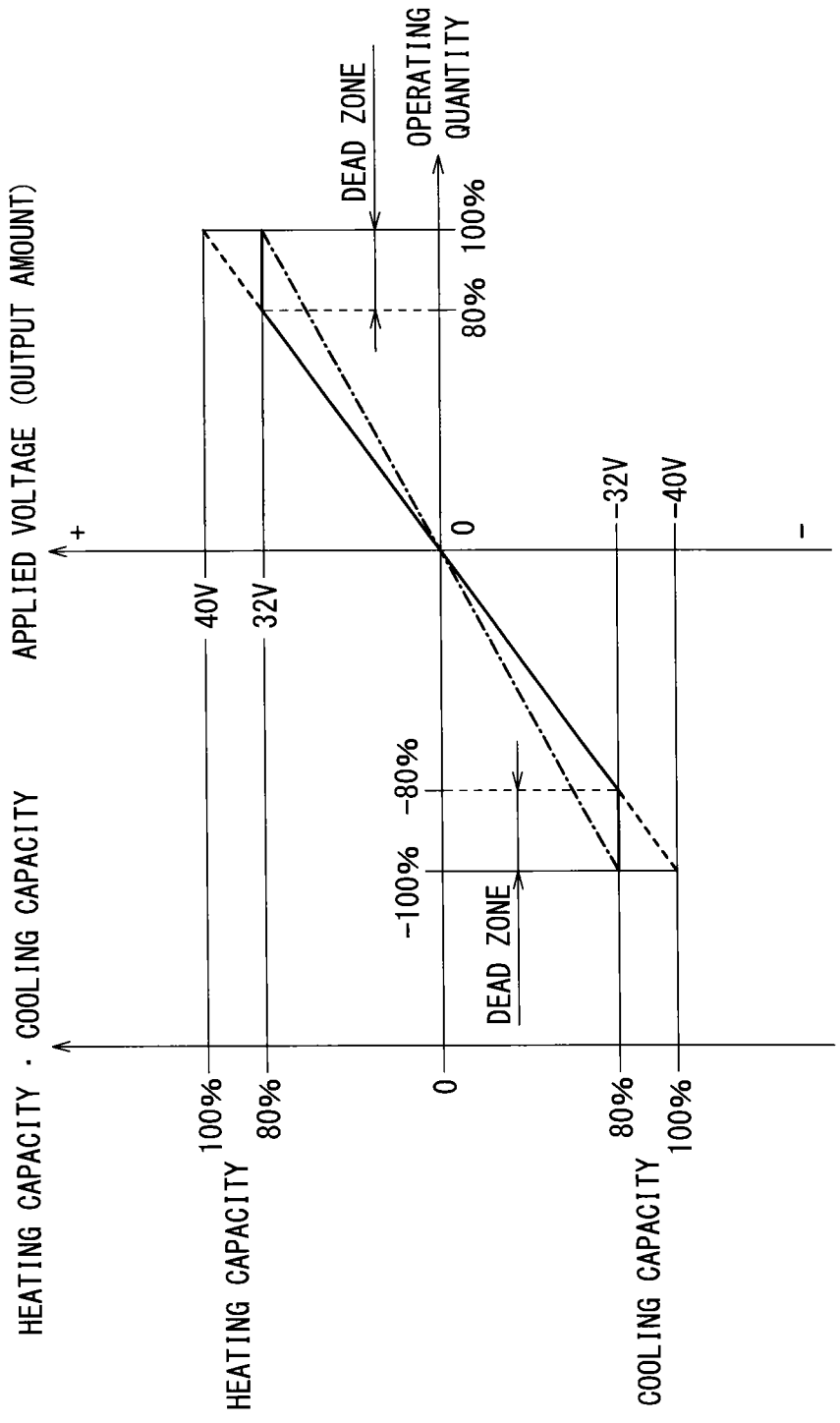
FIG. 18 is a graph showing an example of power savings.

More specifically, as shown in FIG. 18, in the case that the heating capacity or the cooling capacity is 100%, with respect to an operating quantity between −100% and +100%, the applied voltage changes within a range from −40 V to +40 V. On the other hand in the case that mode (A) is used and functions to lower the heating capacity and the cooling capacity by 20%, as shown by the one-dot dashed line in FIG. 18, with respect to an operating quantity between −100% and +100%, the applied voltage undergoes a scaling change to a range from −32 V to +32 V.

In this case, a reduction in temperature controllability is prevented, because if the applied voltage V (output amount) in excess of ±32 V is simply limited within each section of the operating quantity from +80% to +100% and from −80% to −100%, dead zones are created in which the output amount does not change.

Further, with the present embodiment, in the case that the (A) mode is used and functions to maintain the solid line characteristic shown in FIG. 18 while upper and lower limit values of the operating quantity are limited to ±80%, the applied voltage V can be subjected to a variable control within the section from −80% to +80%.

Figure 19:
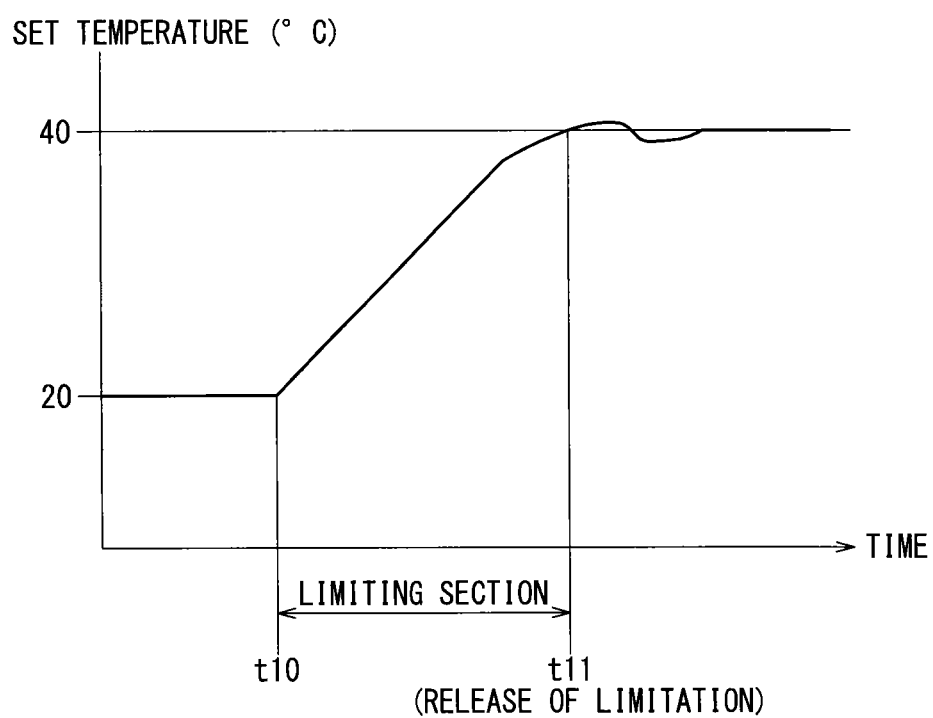
FIG. 19 is a timing chart showing another example of power savings.

On the other hand, with the (B) mode, as shown in FIG. 19, when the set temperature of the circulating liquid 18 is changed, or at a time of starting the temperature adjustment apparatus 10, or the like, in the case that the set temperature of the circulating liquid 18 and the current temperature are significantly distanced from one another, the heating capacity and the cooling capacity of the temperature adjustment apparatus 10 are limited. In this case, from time t10 at which the set temperature is modified, when the current temperature arrives at the set temperature (40° C. in FIG. 19) at time t11, the limitation on the heating capacity and the cooling capacity is released. For carrying out the (B) mode, the set temperature is set in the memory 78 by the parameter setting unit 56, and the current temperature of the circulating liquid 18 is detected by the temperature sensor 36. In addition, in the control circuit 58, the limitation and release of the limitation may be judged based on a comparison between the set temperature and the current temperature.

Description of the Third Advantage of the Present Embodiment

With the temperature detecting unit 16 in which the Peltier element 12 is used, a single Peltier element 12 is not used alone in isolation, but rather, as shown in FIG. 6, a plurality of Peltier elements 12 are used in combination.

For example, in the event that one of the Peltier elements 12 in the A-row has failed, the applied current I will flow only through the B-row. As a result, the heating capacity and the cooling capacity of the temperature adjustment apparatus 10 including the temperature adjusting unit 16 are reduced by one half. Consequently, if the temperature of the circulating liquid 18 cannot be maintained at the constant temperature, an abnormality is judged to have occurred in the temperature control, and the abnormality can be handled prior to the occurrence of a failure.

However, if the load 20 is a semiconductor manufacturing apparatus, since during stopping of the process the heat load is small, the circulating liquid 18 can be maintained at the constant temperature. However, on the other hand, when the process is initiated, the heat load is large, and the temperature cannot be maintained at the constant temperature. As a result, on the side of the load 20, a secondary problem takes place.

Further, in the case that the Peltier elements 12 are driven simply by the current control method, if the applied current I flows to the B-row only, there is a concern that deterioration in performance or a failure of the Peltier elements 12 of the B-row may take place.

Accordingly, if the failure can be detected at a point in time that the failure of the Peltier element 12 occurs, the above problems can be resolved.

Thus, according to the present embodiment, fault detecting conditions for the Peltier elements 12 are set in the memory 78 from the parameter setting unit 56, and in the failure judging unit 82 it is judged whether or not a failure of the Peltier elements 12 has occurred from the applied voltage V and the applied current I of the Peltier elements 12.

More specifically, the characteristics of the applied voltage V and the applied current I are determined by the temperature difference ΔT as well as the manner in which the Peltier elements 12 are combined. Therefore, if the value of the applied current I with respect to the applied voltage V differs significantly from such characteristics, it can easily be judged that some type of abnormality has occurred in the Peltier elements 12.

Advantages of the Present Embodiment

As described above, with the temperature adjustment apparatus 10 according to the present embodiment, the control circuit 58 calculates a desired output amount by extracting at least the electrical state of the Peltier element 12, and the drive circuit 66 is controlled with the control quantity based on the calculated desired output amount. That is, in the control circuit 58, a feedback control is adopted to control the Peltier element 12, such that the electrical state is reflected on the Peltier element 12. Therefore, compared to the conventional technique in which an open loop control (in which the electrical state is not reflected) is adopted that does not take into consideration the electrical state of the Peltier element 12, according to the present embodiment, the occurrence of a deterioration in performance and failure of the Peltier element 12 can be avoided. As a result, with the present embodiment, since it is possible to operate the temperature adjustment apparatus 10 up to the maximum standard value of the Peltier element 12, the temperature adjustment capability (i.e., the heating capacity and the cooling capacity with respect to the circulating liquid 18) of the temperature adjustment apparatus 10 can be enhanced.

Further, using the applied voltage V, the applied current I, and the electromotive force Ve, which are detected, the control circuit 58 determines the control quantity with respect to the drive circuit 66, and controls the drive circuit 66 with the control quantity. Therefore, the applied voltage V and the applied current I can be supplied appropriately to the Peltier element 12 from the variable power source 62.

Furthermore, because the variable power source 62 performs a variable control, in which the applied voltage V and the applied current I are continuously changed over time responsive to the control quantity, generation of peak currents caused by repeated ON and OFF operations, such as in a PWM control, can be prevented.

Further, because parameters related to operation of the Peltier element 12 are set in the memory 78 of the control circuit 58 from the parameter setting unit 56, the control circuit 58 controls the drive circuit 66 based on such parameters, and based on the applied voltage V, the applied current I, and the electromotive force Ve, which are detected. Consequently, driving of the Peltier element 12 can be carried out optimally.

Further, if the applied voltage V exceeds the maximum voltage value Vtmax, Vcmax, the applied current I exceeds the current limit Itlim, Iclim value, or if the temperature difference ΔT exceeds the temperature difference limit value ΔTlim, there is a concern that the performance of the Peltier element 12 may be deteriorated, or that the Peltier element 12 may suffer from a failure. Thus, in the temperature adjustment apparatus 10, by controlling the drive circuit 66 with the control circuit 58 based on comparisons with the maximum voltage value Vtmax, Vcmax, the current limit value Itlim, Iclim, and the temperature difference limit value ΔTlim, which are predefined parameters, without causing deterioration or a failure of the Peltier element 12, the Peltier element 12 can be used up to its maximum standard values (the maximum voltage value Vtmax, Vcmax, the current limit value Itlim, Iclim, and the temperature difference limit value ΔTlim). As a result, the heating capacity and the cooling capacity of the temperature adjustment apparatus 10 can be drawn out to their maximum extent, and temperature management (monitoring) of the circulating liquid 18 can be carried out appropriately.

More specifically, the Peltier element 12 possesses characteristics such that, accompanying a temperature difference ΔT between a heat-absorbing side and a heat-radiating side thereof, the resistance value and the heat-absorbing amount (electromotive force Ve) of the Peltier element 12 are changed. For this reason, even if the same applied voltage V is applied to the Peltier element 12, due to the temperature state of the Peltier element 12, cases may occur in which the applied current I exceeds the maximum standard value (the current limit value Itlim, Iclim). Consequently, in the event that the applied current I flows in excess of the current limit value Itlim, Iclim, by switching to the constant current operation, deterioration in performance or a failure of the Peltier element 12 can effectively be avoided. Further, when the applied current I is decreased to a value that is less than or equal to the current limit value Itlim, Iclim, by returning from the constant current operation to the variable voltage control, the original control can quickly be restored.

Further, in the case that the temperature difference ΔT converted by the temperature difference converting unit 80 exceeds the temperature difference limit value ΔTlim, the control circuit 58 controls the variable power source 62 so that the temperature difference ΔT becomes less than or equal to the temperature difference limit value ΔTlim, and the applied voltage V is lowered. Consequently, deterioration in performance or a failure of the Peltier element 12 caused by a temperature rise in excess of the temperature difference limit value ΔTlim can effectively be avoided.

However, in spite of a fact that the variable power source 62 is controlled so that the temperature difference ΔT becomes less than or equal to the temperature difference limit value ΔTlim, if the temperature difference ΔT continues to rise, the control circuit 58 needs to suspend application of the applied voltage V to the Peltier element 12 from the variable power source 62. Conventionally, in the event that the Peltier element 12 is placed in a high temperature state, application of the applied voltage V is suspended by detecting such a high temperature state using the thermostat 60 or the like. However, with the present embodiment, since the temperature difference ΔT is monitored, application of the applied voltage V can be suspended prior to the occurrence of a faulty state in the Peltier element 12.

Further, when the polarity of the applied voltage V that is applied to the Peltier element 12 is switched by the polarity reversing circuit 50, the control circuit 58 carries out a constant current control to maintain the applied current I at a fixed value, and controls the variable power source 62 so that the time constant of the applied current I becomes longer. Thus, failure or deterioration in performance of the Peltier element 12 due to generation of an over-current every time that the polarity is switched, can be suppressed.

Further, by the control circuit 58 controlling the variable power source 62 to adjust the applied voltage V and the applied current I, the heating capacity and the cooling capacity of the Peltier element 12 can freely be changed. Therefore, by setting the power saving value, and carrying out a power saving operation in which the applied voltage V and the applied current I are limited based on the set power saving value, a reduction in power consumption (energy savings) of the temperature adjustment apparatus 10 can be realized.

In this case, if the control circuit 58 limits an output range of the applied voltage V with respect to the operating quantity based on the power saving value, the maximum power consumption of the temperature adjustment apparatus 10 can be reduced.

Further, until the temperature of the circulating liquid 18 reaches the set temperature corresponding to the power saving value, the applied voltage V and the applied current I are limited, whereas, if the temperature reaches the set temperature, limiting of the applied voltage V and the applied current I is released.

Accordingly, in the case that the current temperature of the Peltier element 12 deviates from the set temperature, for example, at a time of initial operation of the temperature adjustment apparatus 10 or when the set temperature is modified by the parameter setting unit 56, etc., the temperature adjustment capability is limited while the temperature of the Peltier element 12 changes over a time until reaching the set temperature. Once the temperature of the Peltier element 12 reaches and is stabilized at the set temperature, the limitation on the temperature adjustment capability is released. Thus, it is possible to realize a power savings during times that the temperature of the Peltier element 12 is raised and lowered.

Further, by providing the failure judging unit 82 in the control circuit 58, failure of the Peltier element 12 can be detected quickly and reliably. In this manner, by providing the failure judging unit 82 in the control circuit 58, from the applied voltage V that is detected by the applied voltage detecting circuit 48, the failure judging unit 82 is capable of judging (diagnosing) whether or not a malfunction in the output (applied voltage V) of the converter 44 (whether or not a failure of the converter 44) has taken place. Furthermore, the failure judging unit 82 can compare the applied voltage V detected by the applied voltage detecting circuit 48 with the electromotive force Ve detected by the electromotive force detecting circuit 52, and is capable of judging (diagnosing) whether or not a failure has occurred in the polarity reversing circuit 50.

Furthermore, with the present embodiment, the electromotive force Ve is detected in a time band in which application of the applied voltage V with respect to the Peltier element 12 is temporarily suspended, and upon completion of detection of the electromotive force Ve, application of the applied voltage V is started again. Additionally, in the case that application of the applied voltage V and detection of the electromagnetic force Ve are performed alternately, the detection time of the electromotive force Ve is shorter than the time during which the applied voltage V is applied. Accordingly, the influence of heat of the heat-absorbing side and the heat-radiating side of the Peltier element 12, and the influence of a change in temperature of the circulating liquid 18 can be suppressed, so that the electromotive force Ve can be measured correctly.

Further, if the electromotive force detecting circuit 52 is constituted by a diode bridge circuit, even in the case that the direction (polarity) of the electromotive force of the Peltier element 12 undergoes a change, it is possible to measure the electromotive force Ve of either polarity. In the case of a diode bridge circuit, it is necessary for the electromotive force Ve to be of a voltage value that is greater than or equal to the forward voltage VF of each of the diodes 52a to 52d. However, with the present embodiment, since a comparatively large temperature difference ΔT is measured, it is possible to avoid a problem in which the temperature difference ΔT cannot be measured because of the electromotive force Ve which is less than the forward voltage VF.

Although a preferred embodiment of the present invention has been presented above, the temperature adjustment apparatus according to the present invention is not limited to this embodiment, and various changes and modifications may be made thereto without departing from the scope of the invention as set forth in the appended claims.

What is claimed is:

1. A temperature adjustment apparatus for adjusting a temperature of a control object using a Peltier element, comprising:
    a drive circuit configured to drive the Peltier element at a desired output amount;
    a state detector configured to detect an electrical state of the Peltier element;
    a control circuit configured to calculate the desired output amount based at least on the electrical state of the Peltier element, determine a control quantity for driving the Peltier element at the desired output amount, and control the drive circuit at the control quantity;
    a parameter setter configured to set a parameter related to operation of the Peltier element;
    a temperature sensor to that detects the temperature of the control object; and
    a temperature regulator that outputs an operating quantity to the control circuit for adjusting the temperature of the control object to a desired temperature,
    wherein:
    the drive circuit comprises a DC power source that causes a direct current to flow to the Peltier element, by applying a DC voltage as the output amount to the Peltier element,
    the DC power source is a variable power source in which a value of the direct current can be varied by changing a value of the DC voltage,
    the control circuit performs a variable control by controlling the DC power source, whereby the value of the DC voltage and the value of the direct current are changed to desired values responsive to the control quantity,
    the electrical state of the Peltier element is defined by the DC voltage, the direct current, and an electromotive force of the Peltier element,
    the state detector includes a voltage detecting control circuit configured to detect the DC voltage, a current detecting circuit configured to detect the direct current, and an electromotive force detecting circuit configured to detect the electromotive force,
    the parameter setter sets a temperature adjustment capability limiting value for limiting a temperature adjustment capability of the Peltier element with respect to the control object,
    the control circuit controls the drive circuit based on the operating quantity, the parameter, the DC voltage detected by the voltage detecting circuit, the direct current detected by the current detecting circuit, and the electromotive force detected by the electromotive force detecting circuit, and
    by controlling the DC power source based further on the temperature adjustment capability limiting value, the control circuit limits the DC voltage and the direct current.

2. The temperature adjustment apparatus according to claim 1, wherein:

the parameters are a maximum voltage value, which is a maximum value of the DC voltage that can be applied to the Peltier element, a current limit value, which is a maximum value of the direct current flowing to the Peltier element, and a temperature difference limit value, which is a permissible value of a temperature difference between a heat-absorbing side and a heat-radiating side of the Peltier element corresponding to the electromotive force;

the control circuit further comprises a temperature difference converter, which converts the electromotive force detected by the electromotive force detecting circuit into the temperature difference; and the drive circuit is controlled based on a comparison between the maximum voltage value and the DC voltage detected by the voltage detecting circuit, a comparison between the current limit value and the direct current detected by the current detecting circuit, and a comparison between the temperature difference limit value and the temperature difference converted by the temperature difference converter.

3. The temperature adjustment apparatus according to claim 2, wherein in the control circuit:

in a case that a DC voltage is applied to the Peltier element from the DC power source, and when the direct current detected by the current detecting circuit exceeds the current limit value, control with respect to the DC power source is switched from a variable voltage control, which is configured to vary a value of the DC voltage, to a constant current operation for holding the value of the DC voltage at a predetermined value while maintaining the direct current at the current limit value; and wherein, if the direct current detected by the current detecting circuit becomes less than or equal to the current limit value, the control with respect to the DC power source is restored from the constant current operation to the variable voltage control.

4. The temperature adjustment apparatus according to claim 2, wherein, in a case that the temperature difference converted by the temperature difference converter has exceeded the temperature difference limit value, the control circuit controls the DC power source so that the temperature difference becomes less than or equal to the temperature difference limit value, and the value of the DC voltage is reduced.

5. The temperature adjustment apparatus according to claim 4, wherein, when the DC power source is controlled so that the temperature difference becomes less than or equal to the temperature difference limit value, but the temperature difference continues to rise, the control circuit suspends application of the DC voltage to the Peltier element from the DC power source.

6. The temperature adjustment apparatus according to claim 2, wherein:

the drive circuit further comprises a polarity reversing circuit that switches polarity of the DC voltage output from the DC power source, and applies the DC voltage the polarity of which has been switched to the Peltier element; and when the polarity of the DC voltage that is applied to the Peltier element is switched by the polarity reversing circuit, the control circuit carries out a constant current control to maintain the direct current at a fixed value, and controls the DC power source so that a time constant of the direct current becomes longer.

7. The temperature adjustment apparatus according to claim 1, wherein based on the temperature adjustment capability limiting value, the control circuit limits an output range of the DC voltage with respect to the operating quantity.

8. The temperature adjustment apparatus according to claim 1, wherein the control circuit limits the DC voltage and the direct current until the temperature of the control object reaches a predetermined temperature corresponding to the temperature adjustment capability limiting value, wherein when the temperature of the control object reaches the predetermined temperature, limiting of the DC voltage and the direct current is released.

9. The temperature adjustment apparatus according to claim 1, wherein the control circuit further comprises a failure detector, which judges that the Peltier element is suffering from a failure, in an event that the value of the direct current detected by the current detecting circuit deviates from characteristics of the DC voltage and the direct current based on a temperature difference between a heat-absorbing side and a heat-radiating side of the Peltier element corresponding to the electromotive force.

10. The temperature adjustment apparatus according to claim 1, wherein:

the control circuit carries out detection of the electromotive force by the electromotive force detection circuit in a time band in which application of the DC voltage to the Peltier element from the DC power source is temporarily suspended, and upon completion of detection of the electromotive force, reapplies the DC voltage to the Peltier element from the DC power source; and in a case that application of the DC voltage and detection of the electromagnetic force are performed alternately, a detection time of the electromotive force is shorter than a time during which the DC voltage is applied.

11. The temperature adjustment apparatus according to claim 10, wherein the electromotive force detecting circuit is a diode bridge circuit.

* * * * *